（12）United States Patent
Yoshioka et al.

(10) Patent No.: US 10,167,932 B2
(45) Date of Patent: Jan. 1, 2019

(54) LOADING CAM DEVICE AND FRICTION ROLLER-TYPE SPEED REDUCER

(71) Applicant: NSK LTD., Tokyo (JP)

(72) Inventors: Hiroyasu Yoshioka, Fujisawa (JP); Eiji Inoue, Fujisawa (JP); Takashi Imanishi, Fujisawa (JP); Hirotaka Kishida, Fujisawa (JP)

(73) Assignee: NSK LTD., Tokyo (JP)

( * ) Notice: Subject to any disclaimer, the term of this patent is extended or adjusted under 35 U.S.C. 154(b) by 138 days.

(21) Appl. No.: 15/514,285

(22) PCT Filed: Sep. 26, 2014

(86) PCT No.: PCT/JP2014/075638
§ 371 (c)(1),
(2) Date: Mar. 24, 2017

(87) PCT Pub. No.: WO2016/046955
PCT Pub. Date: Mar. 31, 2016

(65) Prior Publication Data
US 2017/0299024 A1 Oct. 19, 2017

(51) Int. Cl.
*F16H 15/50* (2006.01)
*F16H 13/08* (2006.01)
(Continued)

(52) U.S. Cl.
CPC .............. *F16H 15/50* (2013.01); *F16H 13/08* (2013.01); *F16H 25/186* (2013.01); *F16H 55/56* (2013.01);
(Continued)

(58) Field of Classification Search
None
See application file for complete search history.

(56) References Cited

U.S. PATENT DOCUMENTS 3,701,400 A * 10/1972 Burnett ................... F16D 65/18
188/72.6
4,422,600 A * 12/1983 Preston .............. A01K 89/0193
242/271
(Continued)

FOREIGN PATENT DOCUMENTS

EP 2 093 092 A2 8/2009
EP 2 687 752 A1 1/2014
(Continued)

OTHER PUBLICATIONS

Search Report dated Dec. 22, 2014, issued by the International Searching Authority in counterpart International Application No. PCT/JP2014/075638 (PCT/ISA/210).
(Continued)

*Primary Examiner* — Colby M Hansen
(74) *Attorney, Agent, or Firm* — Sughrue Mion, PLLC

(57) ABSTRACT

Projections protruding towards a cam plate and a disc are provided on both axial side surfaces of the retainer at a plurality of positions at which phases of the projections in the circumferential direction are offset from pockets. One axial direction surface of the cam plate and the disc are formed with concave portions at portions facing the respective projections. The concave portions have an axial depth deepest at a center portion thereof in the circumferential direction and becoming shallower towards both end portions thereof.

13 Claims, 19 Drawing Sheets

(51) Int. Cl.
*F16H 55/56* (2006.01)
*F16H 25/18* (2006.01)
*F16H 57/08* (2006.01)
*F16H 63/06* (2006.01)
*F16H 63/30* (2006.01)

(52) U.S. Cl.
CPC ........... *F16H 57/08* (2013.01); *F16H 63/065* (2013.01); *F16H 63/3023* (2013.01); *F16H 2057/087* (2013.01)

(56) References Cited

U.S. PATENT DOCUMENTS

| | | | | |
|---|---|---|---|---|
| 4,550,810 | A | * | 11/1985 | Price ........................ F16D 55/46 188/106 F |
| 4,944,372 | A | * | 7/1990 | Taig ....................... B60T 13/741 188/156 |
| 5,487,452 | A | * | 1/1996 | Moinard ................. F16D 55/14 188/72.6 |
| 5,609,227 | A | * | 3/1997 | Mery ...................... F16D 65/18 188/72.6 |
| 2010/0093485 | A1 | | 4/2010 | Pohl et al. |
| 2014/0024487 | A1 | | 1/2014 | Tanaka et al. |

FOREIGN PATENT DOCUMENTS

| | | |
|---|---|---|
| JP | 06-174030 A | 6/1994 |
| JP | 08-200463 A | 8/1996 |
| JP | 09-280342 A | 10/1997 |
| JP | 10-281269 A | 10/1998 |
| JP | 11-063165 A | 3/1999 |
| JP | 11-193856 A | 7/1999 |
| JP | 2006-002882 A | 1/2006 |
| JP | 2008-309282 A | 12/2008 |
| JP | 2012-193792 A | 10/2012 |
| JP | 2012-197930 A | 10/2012 |
| JP | 2012-207778 A | 10/2012 |

OTHER PUBLICATIONS

Written Opinion dated Dec. 22, 2014, issued by the International Searching Authority in counterpart International Application No. PCT/JP2014/075638 (PCT/ISA/237).
Communication issued by the European Patent Office dated Oct. 30, 2017 in counterpart European Patent Application No. 14902687.4.

* cited by examiner

LOADING CAM DEVICE AND FRICTION ROLLER-TYPE SPEED REDUCER

TECHNICAL FIELD

The present invention relates to a loading cam device and a friction roller-type speed reducer.

BACKGROUND ART

For example, Patent Documents 1 and 2 disclose using a friction roller-type speed reducer to reduce rotation of an output shaft of a small electric motor rotating at high speed and then to transmit the same to driving wheels such that efficiency of the electric motor as a driving source of an electric vehicle is improved to lengthen a mileage per one time charging. FIGS. 13 to 18 show a friction roller-type speed reducer disclosed in Patent Document 2.

A friction roller-type speed reducer 1 is configured to rotationally drive a sun roller 3 by an input shaft 2 to transmit rotation of the sun roller 3 to an annular roller 5 via a plurality of intermediate rollers 4, 4, and to take out rotation of the annular roller 5 from an output shaft 6. The respective intermediate rollers 4, 4 are configured to only rotate on rotation axes 7, 7 provided at respective center parts thereof and do not revolve around the sun roller 3. The sun roller 3 is configured by concentrically combining a pair of sun roller elements 8, 8 having the same shape, and a pair of loading cam devices 9, 9 are provided at positions at which the loading cam devices sandwich the sun roller elements 8, 8 from both axial sides. The respective parts are accommodated in a stepped cylindrical housing 10 of which a diameter of an axially intermediate part is larger and diameters of both end portions are smaller.

A base half part (a right half part in FIG. 13) of the input shaft 2 is rotatably supported to an inner side of an input-side small-diameter cylindrical part 11 of the housing 10 by an input-side ball bearing unit 12, and the output shaft 6 is rotatably supported to an inner side of an output-side small-diameter cylindrical part 13 by an output-side ball bearing unit 14. The input shaft 2 and the output shaft 6 are concentrically arranged, and a tip portion of the input shaft 2 is supported to an inner side of a circular concave portion 15 formed at a center portion of a base end surface of the output shaft 6 by a radial rolling bearing 16. A base end portion of the output shaft 6 is coupled to the annular roller 5 by a coupling part 17 having an L-shaped section.

The sun roller elements 8, 8 are arranged concentrically with the input shaft 2 around a tip half part of the input shaft 2 so as to be rotatable relative to the input shaft 2 with a gap being interposed between tip surfaces (facing surfaces) of the sun roller elements. A pair of circular plate-shaped cam plates 18, 18 configuring the loading cam devices 9, 9 are externally fitted and fixed at two positions of an intermediate portion and a tip portion of the input shaft 2, at which the cam plates 18, 18 sandwich the sun roller elements 8, 8 from both axial sides, and is configured to rotate synchronously with the input shaft 2. On the base end surface of each of the sun roller elements 8, 8 and one surface of each of the cam plates 18, 18, which surfaces face each other, driven-side cam surfaces 19, 19 and driving-side cam surfaces 20, 20 are provided at a plurality of positions in the circumferential direction, respectively. Balls (rolling elements) 21, 21 are respectively interposed between the respective cam surfaces 19, 20, so that the loading cam devices 9, 9 are configured. An axial depth of each of the cam surfaces 19, 20 gradually changes in the circumferential direction. That is, the axial depth is deepest at a center portion in the circumferential direction and becomes shallower towards both end portions.

When torque is input to the input shaft 2, a surface pressure of each traction part, which is a rolling contact part between the circumferential surfaces of the respective rollers 3 to 5, is increased, as follows. First, at a state where the torque has not been input to the input shaft 2, the respective balls 21, 21 configuring the loading cam devices 9, 9 exist at bottoms of the respective cam surfaces 19, 20 or at sides close to the bottoms, as shown in FIG. 14A. At this state, the thickness of the loading cam devices 9, 9 is small and an interval between the sun roller elements 8, 8 is wide. Also, each of the intermediate rollers 4, 4 is not pressed outward in a radial direction of the sun roller 3 and the annular roller 5, and even when it is pressed by an elastic force of a preload spring, for example, the pressing force is small.

From the above state, when the torque is input to the input shaft 2 (the friction roller-type speed reducer 1 is activated), the axial thicknesses of the loading cam devices 9, 9 increase based on engagement between the respective balls 21, 21 and the respective cam surfaces 19, 20, as shown in FIG. 14B. Then, the sun roller elements 8, 8 contact inner sides of the respective intermediate rollers 4 with respect to the radial direction of the friction roller-type speed reducer 1, thereby pressing the respective intermediate rollers 4 outward in the radial direction. As a result, the surface pressure of each traction part increases, so that it is possible to transmit power from the sun roller 3 to the annular roller 5 without causing excessive sliding to each traction part. The loading cam devices 9, 9 to be incorporated into the friction roller-type speed reducer 1 have springs provided between the sun roller elements 8 and the cam plates 18 configuring the respective devices and configured to apply elastic forces of relatively displacing both the members 8, 18 in the circumferential direction. Both the members 8, 18 are relatively displaced in the circumferential direction based on the elastic forces of the springs, so that the respective balls 21, 21 override the shallow sides of the respective cam surfaces 19, 20. As a result, it is possible to apply the preload to each traction part by the loading cam devices 9, 9.

During the operation of the friction roller-type speed reducer 1, the respective intermediate rollers 4, 4 rotate about the respective rotation axes 7, 7 and are simultaneously displaced in the radial direction of the friction roller-type speed reducer 1 as the transmission torque is varied. The reason is that the larger the pressing force generated by the loading cam devices 9, 9, the forces of pressing the respective intermediate rollers 4, 4 towards an inner peripheral surface of the annular roller 5 by the loading cam device 9, 9 increase. In order to smoothly perform the rotation and radial displacement of the respective intermediate rollers 4, 4, in the friction roller-type speed reducer 1, the respective intermediate rollers 4, 4 are provided in an annular space 22 between the inner peripheral surface of the annular roller 5 and an outer peripheral surface of the sun roller 3 by a following structure, for example. In order to support the respective intermediate rollers 4, 4, a support frame 25 as shown in FIGS. 15 and 16 is supported and fixed to an inner surface of an end plate 24 which closes one axial side of a large-diameter cylindrical part 23 of the housing 10. The support frame 25 has a structure like a carrier configuring a planetary gear mechanism, and has a pair of circular-ring shaped rim parts 26a, 26b arranged concentrically with each other and coupled and fixed each other at a plurality of positions equally spaced in a circumferential direction by stays 27, 27. The rim parts 26a are screwed to an inner surface of the end plate 24, so that the support frame 25 is supported and fixed to an inner side of the large-diameter cylindrical part 23 concentrically with the sun roller 3.

The respective intermediate rollers 4, 4 are rotatably supported to tip portions of swing frames 28, 28. Each of the swing frames 28, 28 has a pair of support plate parts 29, 29 parallel with each other and coupled at base end edges thereof by a base part 30 to have a U shape, as seen from a radial direction. End portions of the rotation axes 7, 7 of the respective intermediate rollers 4, 4 are respectively rotatably supported to tip portions of the support plate parts 29, 29 of the respective swing frames 28, 28 by ball bearings 31, 31. Also, swing shafts 32, 32 protruding from both side surfaces of a base end portion of each of the swing frames 28, 28 are inserted into support holes 33, 33 formed at matching portions of the rim parts 26a, 26b without any rattling.

The respective swing shafts 32, 32 and the respective rotation axes 7, 7 are parallel with each other and phases in the circumferential direction of the support frame 25 are largely offset. Specifically, in order to make the offset in the circumferential direction of the respective swing shafts 32, 32 and the respective rotation axes 7, 7 as large as possible, a direction of a virtual line connecting each of the swing shafts 32, 32 and each of the rotation axes 7, 7 is made close to a direction of a tangential line to a virtual arc having a center at a center of the support frame 25.

An outer peripheral surface of each of the intermediate rollers 4, 4 has a shape in which an axially intermediate portion is configured as a simple cylindrical surface and both portions thereof are configured as inclined surfaces having a partially conical convex surface shape inclined at the same angle and in the same direction as outer peripheral surfaces of the sun roller elements 8, 8.

The outer peripheral surfaces of the base end portions of the sun roller elements 8, 8 are provided with collar parts 34, 34 having an outward flange shape, respectively. That is, parts of the outer peripheral surfaces of the sun roller elements 8, 8, which are to rolling-contact the outer peripheral surfaces of the respective intermediate rollers 4, 4, are configured as inclined surfaces which are inclined in a direction along which an outer diameter thereof gradually decreases towards a tip surface. The collar parts 34, 34 protrude radially outward over the entire circumference from base end portions of the inclined surfaces. The base end surfaces of the sun roller elements 8, 8, including the collar parts 34, 34, are formed with the respective driven-side cam surfaces 19, 19.

The conventional friction roller-type speed reducer 1 configured as described above is configured to transmit the power from the input shaft 2 to the output shaft 6 while reducing the speed and increasing the torque, as follows. That is, when the input shaft 2 is rotationally driven by an electric motor, the cam plates 18, 18 externally fitted to the input shaft 2 are rotated, so that the sun roller elements 8, 8 are pressed in a direction of coming close to each other and are rotated at the same speed and in the same direction as the input shaft 2 based on the engagement between the respective balls 21, 21 and the respective cam surfaces 19, 20. Then, the rotation of the sun roller 3 configured by the sun roller elements 8, 8 is transmitted to the annular roller 5 via the respective intermediate rollers 4, 4 and is taken out from the output shaft 6. The surface pressure of each traction part is secured to some extent from a time when the friction roller-type speed reducer 1 is activated, by a cam part pressing force generated based on the elastic forces of relatively displacing both the members 8, 18 in opposite directions, which forces are provided by the springs provided between both the members 8, 18. Therefore, from the time of the activation, the power transmission starts at each traction part without causing the excessive slip.

When the torque applied to the input shaft 2 increases, overriding amounts of the respective balls 21, 21, which configure the loading cam devices 9, 9, on the respective cam surfaces 19, 20 increase and the axial thicknesses of the loading cam devices 9, 9 further increase. As a result, the surface pressure of each traction part is further increased and the large torque is transmitted at each traction part without causing the excessive slip. The surface pressure of each traction part is a value obtained by multiplying an appropriate safety factor by a proper value corresponding to the torque to be transmitted between the input shaft 2 and the output shaft 6, specifically a requisite minimum value, and is automatically adjusted.

Also, based on the swing displacement of the respective swing frames 28, 28, the respective intermediate rollers 4, 4 are smoothly displaced in the radially outward direction of the sun roller 3 and the annular roller 5.

The friction roller-type speed reducer 1 as described above has room for improvement, from a standpoint of improving transmission efficiency. That is, during the operation of the friction roller-type speed reducer 1, while the input shaft 2 is rotating, the respective balls 21, 21 configuring the loading cam devices 9, 9 rotate (revolves) between the sun roller elements 8, 8 and the cam plates 18, 18. The respective balls 21, 21 are strongly pressed to portions (portions surrounded by a dashed-dotted line α in FIG. 19) near the radially outer sides of the respective cam surfaces 19, 20 by the centrifugal force applied to the respective balls 21, 21 based on the rotation. Therefore, the axial pressing force to be generated by the loading cam devices 9, 9 has a summed magnitude of a force, which is to be generated by increasing the overriding amounts of the respective balls 21, 21 on the respective cam surfaces 19, 20 and an axial component force $F_x$ of a force based on the centrifugal force. The force based on the centrifugal force is determined by a rotation speed of the input shaft 2 and a contact angle between the respective balls 21, 21 and the respective cam surfaces 19, 20. In the conventional structure as described above, it is difficult to regulate the contact angle with high precision. For this reason, the axial pressing force generated by the loading cam devices 9, 9 becomes excessively large, so that the surface pressure of each traction part excessively increases. As a result, the transmission efficiency of the friction roller-type speed reducer 1 may be lowered.

Regarding the above problems, it is considered to prevent the axial force to be generated by the loading cam device from excessively increasing by providing a circular ring-shaped retainer, which is configured to bear the centrifugal force to be applied to the respective balls configuring the loading cam device and to regulate the radial positions of the respective balls to appropriate states, between the cam plate and the sun roller element. However, even when the retainer is provided, following problems may be caused. That is, when the interval between the cam plate and the sun roller element increases as the loading cam device operates, the retainer may come down between the cam plate and the sun roller element or axially rattle (an axial position of the retainer is offset from a center position of the gap between the cam plate and the sun roller element). Thereby, a center axis of rotation of each ball may be inclined from a normal state. Patent Documents 3 to 5 disclose a technique of forming projections on both axial side surfaces of a retainer and preventing the retainer from coming down by the projections. However, in the structure disclosed in each of Patent Documents 3 to 5, the respective projections are formed at portions of the axial side surfaces of the retainer, at which phases in the circumferential direction are the same as pockets. For this reason, the stress is more likely to be concentrated on the portions at which the respective pockets are formed, so that the strength and stiffness of the corresponding portions may be lowered.

Also, the friction roller-type speed reducer 1 as described above has room for improvement from standpoints of securing the durability and improving the transmission efficiency. That is, a limit value (limit traction coefficient $\mu_{max}$) of a traction coefficient with which power can be transmitted without causing harmful slip referred to as gross slip at each traction part is changed under influences of conditions except for the torque to be transmitted between the input shaft 2 and the output shaft 6. For example, as shown with a solid line a in FIG. 10 showing a third aspect of a friction roller-type speed reducer to be described later, as a peripheral speed v of a traction part (rotation speed of outer peripheral surfaces of the sun roller 3 and the respective intermediate rollers 4, 4) increases, the limit traction coefficient $\mu_{max}$ decreases (necessary pressing force increases). In contrast, according to the conventional friction roller-type speed reducer, as shown with a broken line b in FIG. 10, the traction coefficient of each traction part is constant, irrespective of the peripheral speed v. For this reason, when the peripheral speed v is low, the pressing force of each traction part excessively increases (an excessive pressing state is formed), the durability and the transmission efficiency may be lowered. In contrast, if the pressing force is properly made when the peripheral speed v is low, the gross slip is likely to occur at each traction part when the peripheral speed v is high.

PRIOR ART DOCUMENTS

Patent Documents

Patent Document 1: JP-A-2012-197930
Patent Document 2: JP-A-2012-207778
Patent Document 3: JP-A-H09-280342
Patent Document 4: JP-H11-63165
Patent Document 5: JP-H11-193856

SUMMARY OF THE INVENTION

Problem to be Solved

The present invention has been made in view of the above circumstances, and a first object of the present invention is to implement a loading cam device capable of preventing a retainer, which is provided in a gap between a disc and a cam plate, from coming down or axially rattling, and securing strength and stiffness of the retainer, irrespective of an increase in the gap associated with an increase in a pressing force, and a friction roller-type speed reducer having the loading cam device incorporated therein.

Also, a second object of the present invention is to implement a friction roller-type speed reducer capable of securing durability and improving transmission efficiency.

Means for Solving the Problems (1) A loading cam device includes a cam plate, a disc, a retainer and a plurality of balls.

The cam plate has a circular plate shape and includes one axial side surface which is a first cam surface having concaves and convexes in a circumferential direction.

The disc includes one axial side surface which faces the first cam surface and is a second cam surface having concaves and convexes in a circumferential direction.

The retainer has a circular ring shape and is provided between the first cam surface and the second cam surface.

The plurality of balls are provided to contact the first and second cam surfaces at each rolling surface thereof while being rollably held in the retainer.

Particularly, projections protruding towards the cam plate and the disc are provided on both axial side surfaces of the retainer at a plurality of positions at which phases of the projections in the circumferential direction are offset from pockets for holding the respective balls. One axial surfaces of the cam plate and the disc are formed with concave portions at portions facing the respective projections, the concave portions having an axial depth deepest at a center portion thereof in the circumferential direction and becoming shallower towards both end portions thereof in the circumferential direction.

(2) When implementing the loading cam device of (1), the projections may be formed at portions at which the phases in the circumferential direction are middle portions between the pockets adjacent to each other.

(3) When an inclination angle of the both end portions of each concave portion in the circumferential direction is denoted as θ, a distance between a center axis (rotation center of the loading cam device) of the retainer and a radially center portion of each concave portion is denoted as R, an inclination angle of each of the first and second cam surfaces is denoted as φ, and a distance between a center axis (rotation center of the loading cam device) of each of the disc and the cam plate and a radially center portion of each of the first and second cam surfaces is denoted as r, a relation of R·tan θ=r·tan φ may be satisfied (except for an error not causing a practical problem, such as an inevitable manufacturing error).

(4) An axial height of the projections may be larger than a half of a difference between a maximum value and a minimum value of an axial thickness of a gap between the cam plate and the disc.

(5) A friction roller-type speed reducer includes an input shaft, an output shaft, a sun roller, an annular roller, a plurality of intermediate rollers and a loading cam device, similarly to the above-described conventional friction roller-type speed reducer.

The sun roller includes a pair of sun roller elements axially spaced and arranged concentrically with each other around the input shaft with a gap being interposed between tip surfaces thereof, outer peripheral surfaces of the sun roller elements are configured as inclined surfaces inclined in a direction along which outer diameters gradually decrease towards the tip surfaces thereof, and the inclined surfaces are configured as rolling contact surfaces.

The annular roller is arranged concentrically with the sun roller around the sun roller, and an inner peripheral surface thereof is configured as a rolling contact surface.

Outer peripheral surfaces of the intermediate rollers are configured to contact outer peripheral surface of the sun roller and the inner peripheral surface of the annular roller at a state where the intermediate rollers are supported at a plurality of positions in a circumferential direction in an annular space between the outer peripheral surface of the sun roller and the inner peripheral surface of the annular roller so as to be freely rotatable about rotation axes arranged in parallel with the input shaft.

The loading cam device is provided between a disc which is at least one of the sun roller elements and is configured to be rotatable relative to the input shaft, and a cam plate supported to the input shaft so as to be rotatable synchronously with the input shaft, and is configured to rotate the disc while axially pressing the disc towards the other of the sun roller elements as the input shaft rotates.

One member of the annular roller and a member configured to support each of the rotation axes is prohibited from rotating about the sun roller and the other member is coupled to the output shaft such that the output shaft is configured to be rotated by the other member.

Particularly, in the friction roller-type speed reducer, the loading cam device is the loading cam device as described above.

(6) A friction roller-type speed reducer includes an input shaft, an output shaft, a sun roller, an annular roller, a plurality of intermediate rollers and a loading cam device, similarly to the above-described conventional friction roller-type speed reducer.

The sun roller includes a pair of sun roller elements axially spaced and arranged concentrically with each other around the input shaft with a gap being interposed between tip surfaces thereof, outer peripheral surfaces of the sun roller elements are configured as inclined surfaces inclined in a direction along which outer diameters gradually decrease towards the tip surfaces thereof, and the inclined surfaces are configured as rolling contact surfaces, The annular roller is arranged concentrically with the sun roller around the sun roller, and an inner peripheral surface thereof is configured as a rolling contact surface, Outer peripheral surfaces of the intermediate rollers are configured to contact outer peripheral surfaces of the sun roller and the inner peripheral surface of the annular roller at a state where the intermediate rollers are supported at a plurality of positions in a circumferential direction in an annular space between the outer peripheral surface of the sun roller and the inner peripheral surface of the annular roller so as to be freely rotatable about rotation axes arranged in parallel with the input shaft.

The loading cam device is provided between a moveable sun roller element which is at least one of the sun roller elements and is configured to be rotatable relative to the input shaft, and a cam plate supported to the input shaft so as to be rotatable synchronously with the input shaft, is configured to rotate the movable sun roller element while axially pressing the movable sun roller element towards the other of the sun roller element as the input shaft rotates, and is configured by interposing rolling elements between a driven-side cam surface provided at a plurality of positions in a circumferential direction of a base end surface of the moveable sun roller element and a driving-side cam surface provided at a plurality of positions in the circumferential direction of one side surface, which faces the base end surface of the moveable sun roller element, of the cam plate fixed to a part of the input shaft and configured to rotate together with the input shaft, and the driving-side cam surface and the driven-side cam surface having a shape where an axial depth gradually changes in the circumferential direction and becomes shallower towards an end portion, respectively, Further, one member of the annular roller and a member configured to support each of the rotation axes is prohibited from rotating about the sun roller and the other member is coupled to the output shaft such that the output shaft is configured to be rotated by the other member.

Particularly, a hydraulic chamber is provided between the moveable sun roller element and the cam plate, the hydraulic chamber is configured to increase a hydraulic pressure therein based on a centrifugal force which is to be generated as the input shaft rotates, and an axial pressing force which is to be generated by the loading cam device is a summed force of a force which is to be generated as each rolling element overrides the driving-side cam surface and the driven-side cam surface and a force which is to be generated as the hydraulic pressure increases.

(7) When implementing the friction roller-type speed reducer of (6), an inner peripheral surface of the moveable sun roller element may be an inclined surface having a partially conical concave surface shape inclined in a direction along which an inner diameter gradually decreases towards a tip surface. Lubricant may be supplied from a tip portion opening of the moveable sun roller element, and the lubricant may be sent to the hydraulic chamber along the inner peripheral surface of the moveable sun roller element.

(8) When implementing the friction roller-type speed reducer of (7), an outer peripheral surface of a base end portion of the moveable sun roller element may be provided with a collar part having an outward flange shape, and an outer peripheral surface of the cam plate may be provided with a cylindrical part protruding towards a side at which the moveable sun roller element is provided. An outer peripheral surface of the collar part and an inner peripheral surface of the cylindrical part may closely face each other.

(9) When implementing the friction roller-type speed reducer of (8), an oil seal may be provided between the outer peripheral surface of the collar part and the inner peripheral surface of the cylindrical part.

(10) When implementing the friction roller-type speed reducer of (6) to (9), each rolling element may be a ball, a circular ring-shaped retainer configured to hold the balls may be provided between the driving-side cam surface and the driven-side cam surface. Projections protruding towards the cam plate and the moveable sun roller element may be provided on both axial side surfaces of the retainer at a plurality of positions at which phases in the circumferential direction of the projections are offset from pockets for holding the respective balls. One surface of the cam plate and the base end surface of the moveable sun roller element may be formed with concave portions at portions facing the projections, the concave portion having an axial depth deepest at a center portion thereof in the circumferential direction and becoming shallower towards both end portions thereof in the circumferential direction.

(11) When implementing the friction roller-type speed reducer of (10), the projections may be formed at portions at which the phases in the circumferential direction are middle portions between the pockets adjacent to each other.

(12) When implementing the friction roller-type speed reducer of (10), when an inclination angle of both end portions of each concave portion in the circumferential direction is denoted as $\theta$, a distance between a rotation center of the input shaft and a radially center portion of each concave portion is denoted as $R$, an inclination angle of each of the first and second cam surfaces is denoted as $\phi$, and a distance between the rotation center of the input shaft and a radially center portion of each of the first and second cam surfaces is denoted as $r$, a relation of $R \cdot \tan\theta = r \cdot \tan\phi$ may be satisfied (except for an error not causing a practical problem, such as an inevitable manufacturing error).

(13) When implementing the friction roller-type speed reducer of (10), an axial height of the projection may be larger than a half of a difference between a maximum value and a minimum value of an axial thickness of a gap between the cam plate and the moveable sun roller element.

Effects of the Invention

According to the loading cam device and the friction roller-type speed reducer of the present invention, it is possible to prevent the retainer, which is provided in the gap between the disc and the cam plate, from coming down or axially ratting, and to secure the strength and stiffness of the retainer, irrespective of the increase in the gap according to the increase in the pressing force. That is, the projections are provided at the plurality of positions in the circumferential direction on both axial side surfaces of the retainer, and the portions of one axial surfaces of the cam plate and the disc, which portions face the respective projections, are provided with the concave portions. Therefore, even when the gap between the cam plate and the disc increases, it is possible to bring each projection and each concave portion close to each other, so that it is possible to prevent the retainer from coming down or axially rattling. Also, the respective projections are formed at the plurality of positions on both axial side surfaces of the retainer, at which the phases in the circumferential direction are offset from the pockets. Therefore, it is possible to prevent the stress from being excessively concentrated on the portions at which the respective pockets are formed, so that it is possible to secure the strength and stiffness of the retainer.

Also, according to the friction roller-type speed reducer of the present invention, it is possible to secure the durability and to improve the transmission efficiency. That is, the axial pressing force which is to be generated by the loading cam device is a summed force of the force which is to be generated as each rolling element overrides each cam surface and the force which is to be generated as the hydraulic pressure is increased in the hydraulic chamber provided between the cam plate and the moveable sun roller element based on the centrifugal force to be generated as the input shaft rotates. Therefore, it is possible to increase the axial pressing force, which is to be generated by the loading cam device, as the rotation of the input shaft becomes faster. As a result, it is possible to make a traction coefficient of each traction part of the friction roller-type speed reducer smaller (i.e., the pressing force is made larger) as the peripheral speed of each traction part becomes faster.

DETAILED DESCRIPTION OF EMBODIMENTS

<Friction Roller-Type Speed Reducer of First Aspect>

Figure 1:
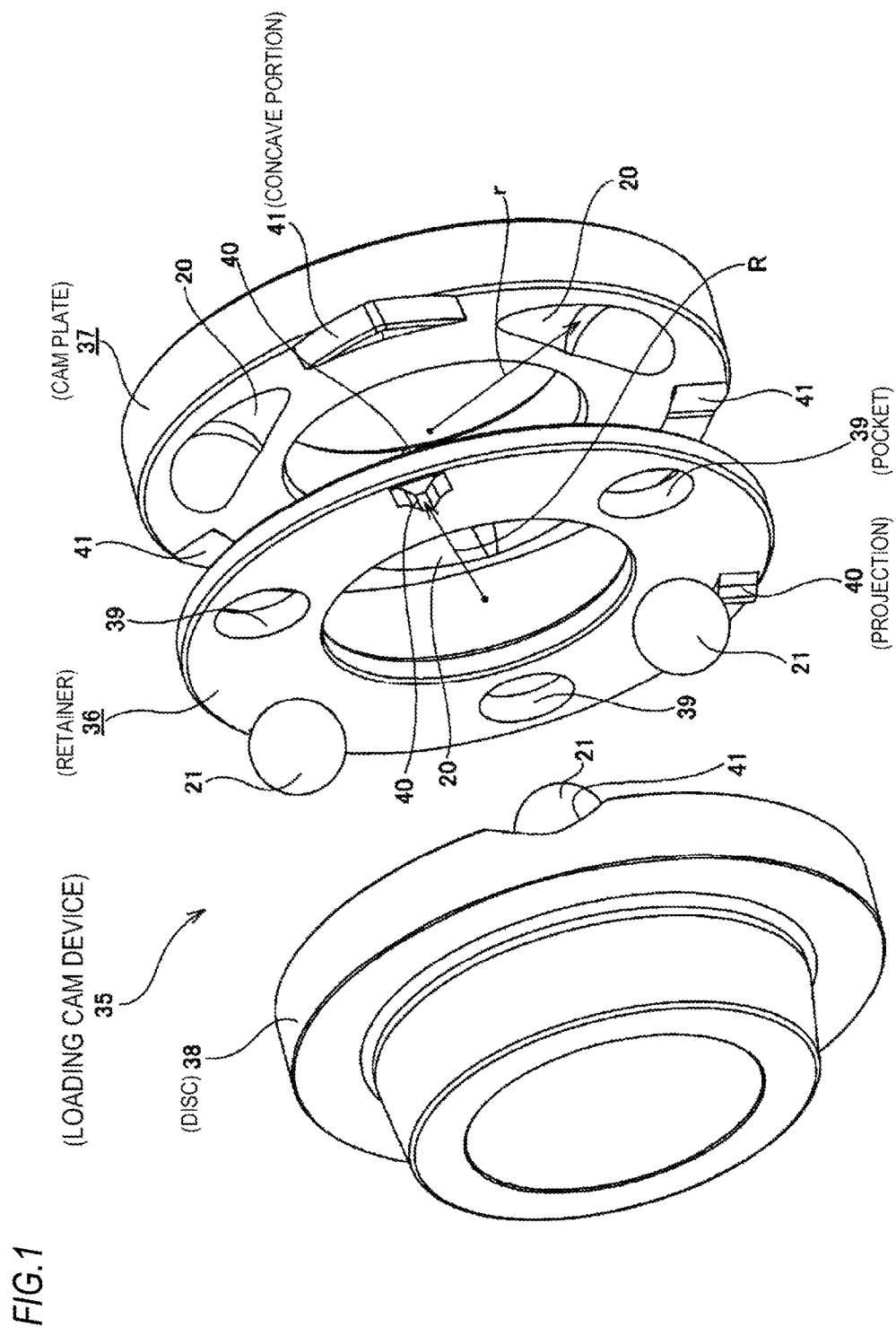
FIG. 1 is an exploded perspective view of a loading cam device in a friction roller-type speed reducer according to a first aspect.
Figure 2:
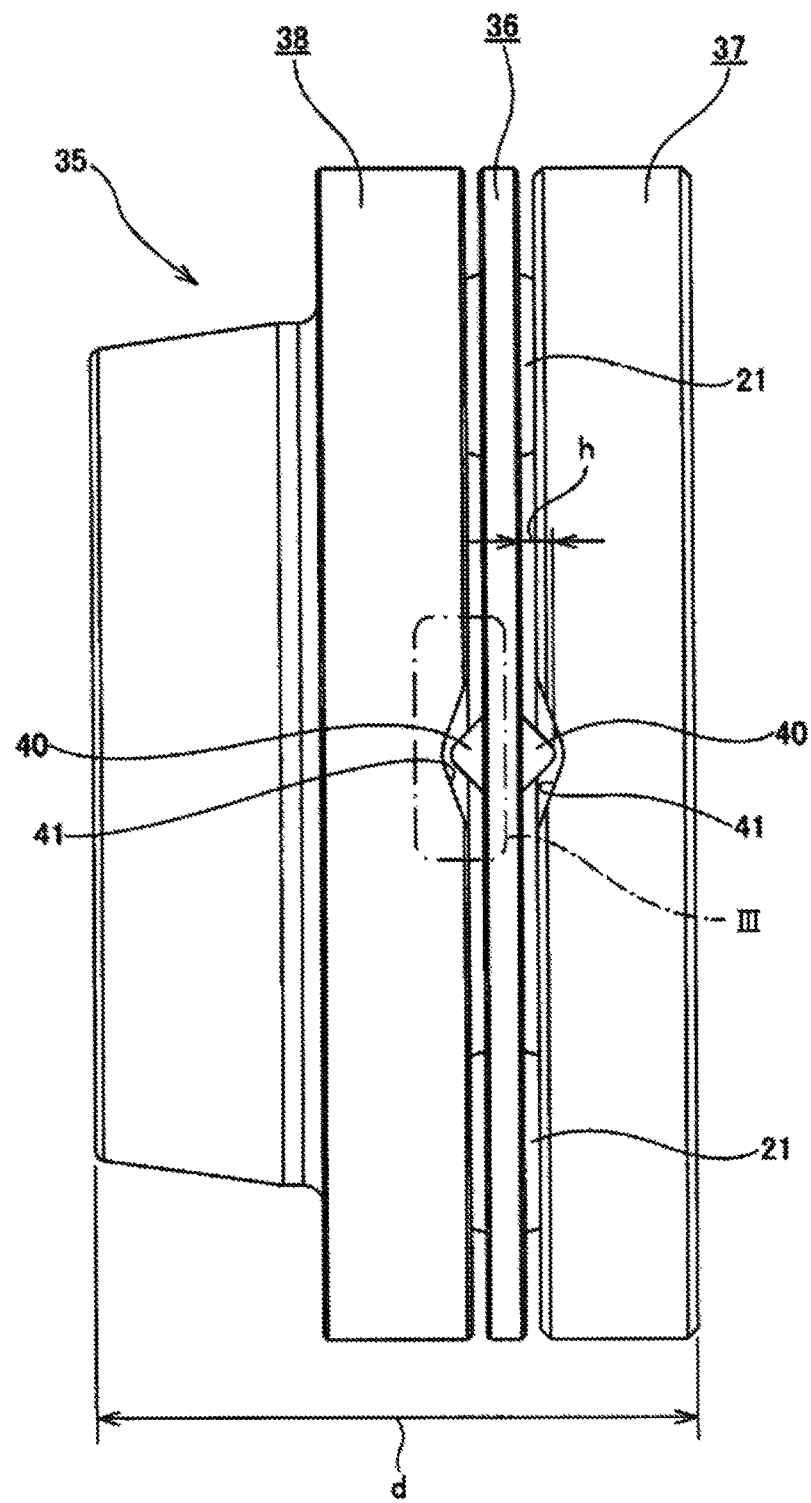
FIG. 2 is a side view showing an assembled state of the loading cam device.

FIGS. 1 to 3 show a loading cam device in a friction roller-type speed reducer according to a first aspect. A feature of this aspect is a structure capable of preventing a retainer 36 incorporated in a loading cam device 35 from coming down or axially rattling and securing strength and stiffness of the retainer 36 even when an axial thickness of the loading cam device 35 increases as the loading cam device 35 operates. The structures and operations of the other parts are similar to the loading cam device incorporated in the conventional friction roller-type speed reducer shown in FIGS. 13 to 18. For this reason, the illustration and description of the equivalent parts will be omitted or simplified, and the feature of the first aspect will be mainly described in the below.

In the first aspect, the loading cam device 35 includes a rotary shaft (not shown), a cam plate 37, a disc (moveable sun roller element) 38, a plurality of (three, in the shown example) balls 21, 21, and a retainer 36. The cam plate 37 is supported around the rotary shaft to such that the cam plate 37 is rotatable synchronously with the rotary shaft and axial displacement thereof is prohibited. The disc 38 is supported around the rotary shaft so as to be rotatable relative to the rotary shaft and to be axially displaceable. Driven-side cam surfaces (second cam surface) 19 and driving-side cam surfaces (first cam surface) 20, 20 are provided at a plurality of positions in a circumferential direction of a base end surface of the disc 38 and one surface of the cam plate 37, which surfaces face each other, and the respective balls 21, 21 are kept to be freely rollable by the retainer 36 between the cam surfaces 19, 20.

In the first aspect, each of the balls 21, 21 is made of ceramics (for example, silicon nitride, silicon carbide, alumina or zirconia). For this reason, as compared to a case where each of the balls 21, 21 is made of iron-based metal (high carbon chromium bearing steel, stainless steel or the like), it is possible to suppress a centrifugal force to be applied to each of the balls 21, 21 when the rotary shaft rotates.

The retainer 36 is formed with pockets 39, 39 for rollably holding the respective balls 21, 21 at a plurality of positions equally spaced in the circumferential direction (three positions, in the shown example). Also, in the first aspect, projections 40, 40 protruding towards the base end surface of the disc 38 and one surface of the cam plate 37 are integrally formed with the retainer 36 at positions, at which phases in the circumferential direction of the projections are offset from the respective pockets 39, 39, of both axial side surfaces of the retainer 36, i.e., radially outer side portions of middle parts in the circumferential direction between the respective pockets 39, 39 adjacent to each other. However, the respective projections 40, 40 may be provided by welding the same to the plurality of positions in the circumferential direction of both axial side surfaces of the retainer 36 or by press-fitting pins into circular holes formed at the plurality of positions in the circumferential direction of both axial side surfaces of the retainer 36, separately from the retainer 36. In any case, an axial height h of each of the projections 40, 40 is made larger than a half (½) of a difference Δd between a maximum value and a minimum value of an axial thickness d of the loading cam device 35 (h>Δd/2).

Concave portions 41, 41 of which an axial depth is deepest at a center portion in the circumferential direction and becomes shallower towards both end portions in the circumferential direction are provided at radially outer side portions of the base end surface of the disc 38 and one surface of the cam plate 37, which portions face the respective projections 40, 40. An inclination angle θ in the circumferential direction of each of the concave portions 41, 41 is restrained so as to satisfy a relation of R·tan θ=r·tan φ when an inclination angle in the same direction of each of the cam surfaces 19, 20 is denoted as φ, a distance between a center axis (center of rotation of the input shaft) of the loading cam device 35 and a radially center portion of each of the concave portions 41, 41 is denoted as R, and a distance between the center axis and a radially center portion of each of the cam surfaces 19, 20 is denoted as r (except for an error not causing a practical problem, such as an inevitable manufacturing error).

Figure 3A:
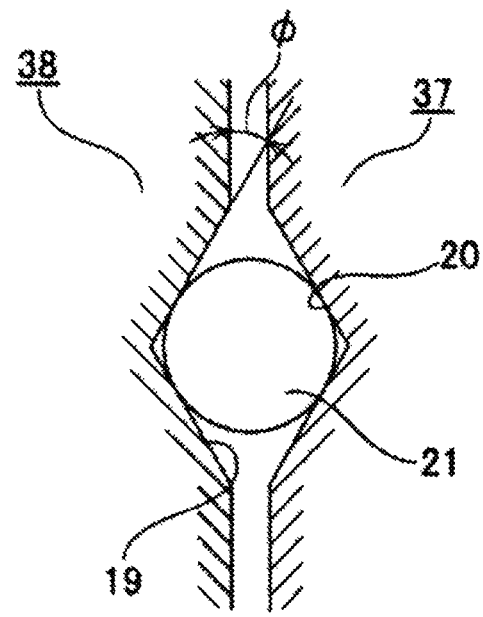
FIG. 3A is a schematic view of the loading cam device for explaining an engagement state between each of driving-side and driven-side cam surfaces and a ball.
Figure 3B:
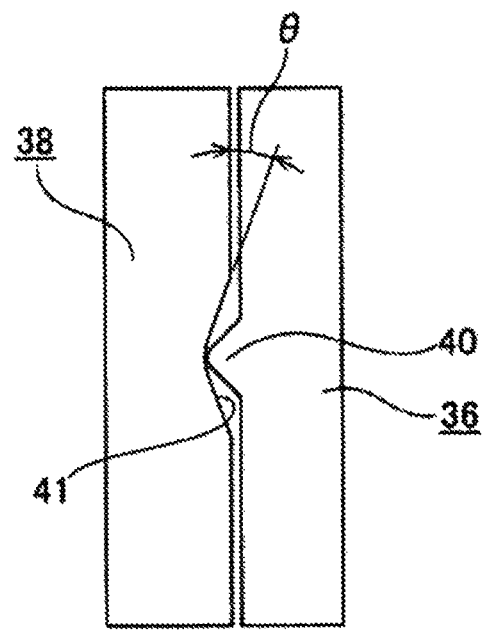
FIG. 3B is an enlarged view of a III part of FIG. 2.
Figure 4A:
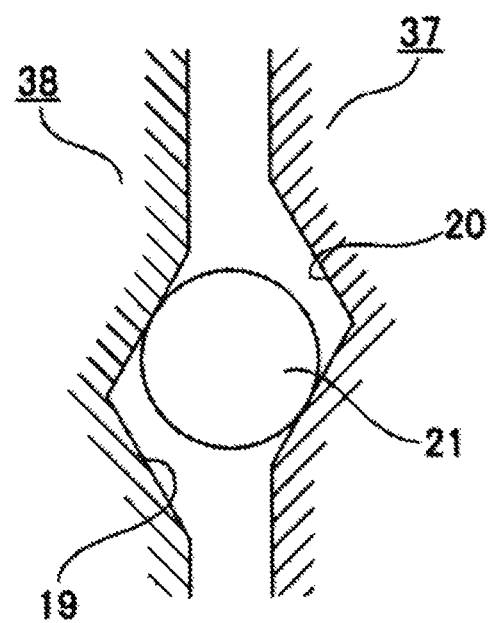
FIG. 4A is a schematic view of the loading cam device for explaining an engagement state between each of driving-side and driven-side cam surfaces and the ball.
Figure 4B:
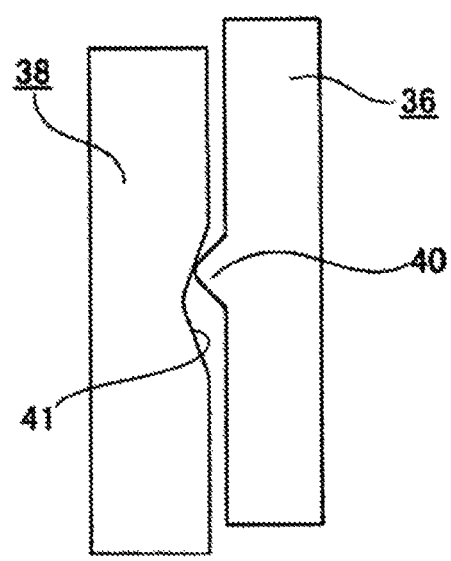
FIG. 4B is an enlarged view of the III part of FIG. 2.

Thereby, it is possible to keep a state where a tip portion of each of the projections 40, 40 and a bottom surface of each of the concave portions 41, 41 face closely each other, irrespective of an increase in a gap between the base end surface of the disc 38 and one surface of the cam plate 37, which is caused as an overriding amount of each of the balls 21, 21 on each of the cam surfaces 19, 20 increases. That is, at a state where the rotary shaft is stationary, each of the balls 21, 21 is positioned at the deepest portion of each of the cam surfaces 19, 20, as shown in FIG. 3A. At this state, the tip portion of each of the projections 40, 40 closely faces a bottom surface of the center portion in the circumferential direction, at which the axial depth is largest, of each of the concave portions 41, 41, as shown in FIG. 3B. In contrast, when the rotary shaft rotates, each of the balls 21, 21 moves to the shallow portions of the respective cam surfaces 19, 20, thereby widening an interval between the disc 38 and the cam plate 37, as shown in FIG. 4A. At this state, the tip portion of each of the projections 40, 40 closely faces a bottom surface of an end side portion of each of the concave portions 41, 41, as shown in FIG. 3B.

In the first aspect, the axial height h of each of the projections 40, 40 is made larger than the half of the difference Δd between the maximum value and the minimum value of the axial thickness d of the loading cam device 35. Therefore, even when the axial thickness of the gap between the base end surface of the disc 38 and one surface of the cam plate 37 becomes largest, the engagement between the respective projections 40, 40 and the respective concave portions 41, 41 is not released.

According to the above-described loading cam device 35 of the first aspect, it is possible to prevent the retainer 36 from coming down or axially ratting, irrespective of the increase in the gap between the base end surface of the disc 38 and one surface of the cam plate 37, which is associated with the operation of the loading cam device 35. That is, the tip portion of each of the projections 40, 40 and the bottom surface of each of the concave portions 41, 41 are kept to closely face each other, irrespective of the increase in the gap. For this reason, when the retainer 36 tends to be axially displaced, a situation where the tip portion of each of the projections 40, 40 and the bottom surface of each of the concave portions 41, 41 are contacted each other and the retainer 36 thus comes down or axially rattles can be prevented.

In the first aspect, the respective projections 40, 40 are formed at the portions of both axial side surfaces of the retainer 36, at which the phases in the circumferential direction are offset from the respective pockets 39, 39. For this reason, an acting position of force to be applied from an inner surface of each of the pockets 39, 39 to the retainer 36 based on the centrifugal force to be applied to each of the balls 21, 21 and an acting position of force to be applied to the retainer 36 based on the presence of the respective projections 40, 40 are offset in the circumferential direction. As a result, it is possible to prevent the stress from being excessively concentrated on the portions at which the respective pockets 39, 39 are formed, and to secure the durability of the retainer 36.

<Friction Roller-Type Speed Reducer of Second Aspect>

Figure 5:
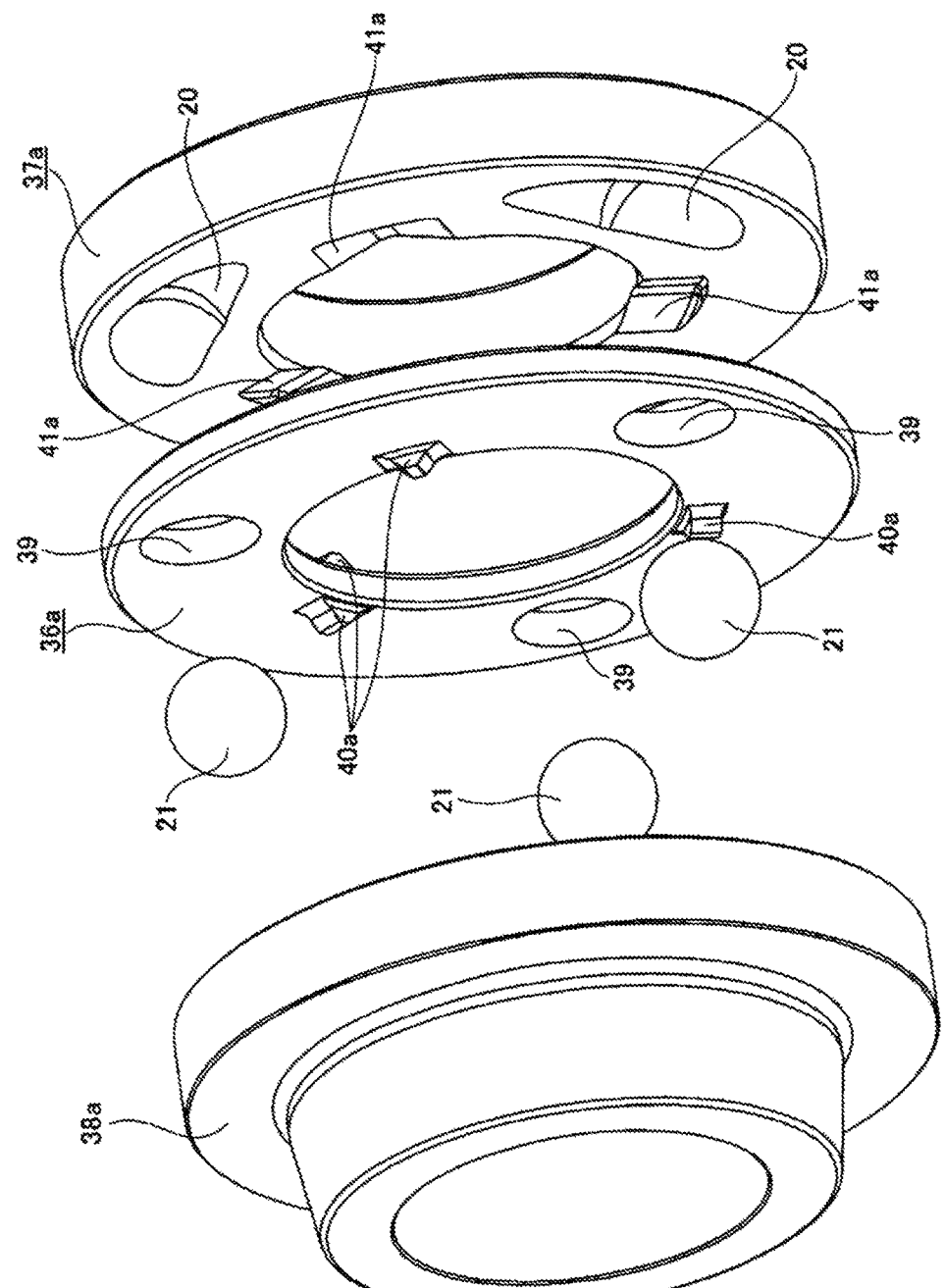
FIG. 5 is an exploded perspective view of a loading cam device in a friction roller-type speed reducer according to a second aspect.
Figure 6:
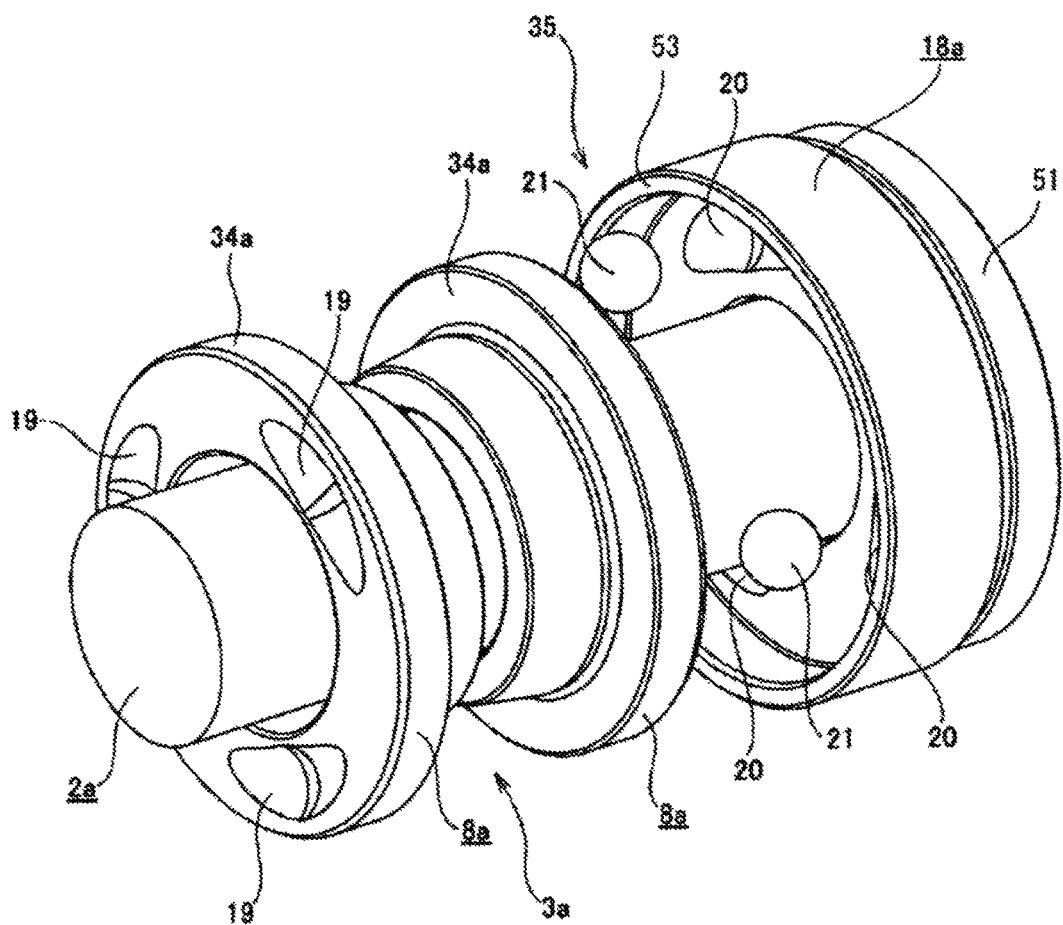
FIG. 6 is an exploded perspective view of a loading cam device in a friction roller-type speed reducer according to a third aspect.
Figure 7:
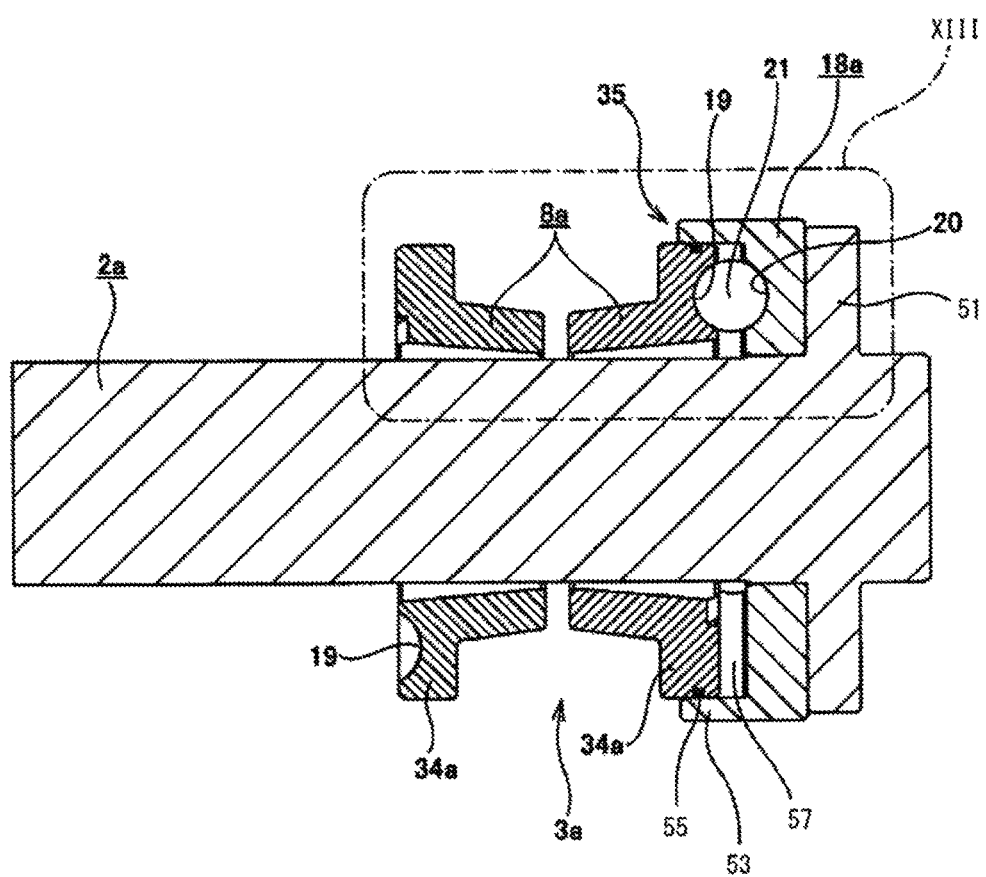
FIG. 7 is a sectional view showing an assembled state of the loading cam device.
Figure 8:
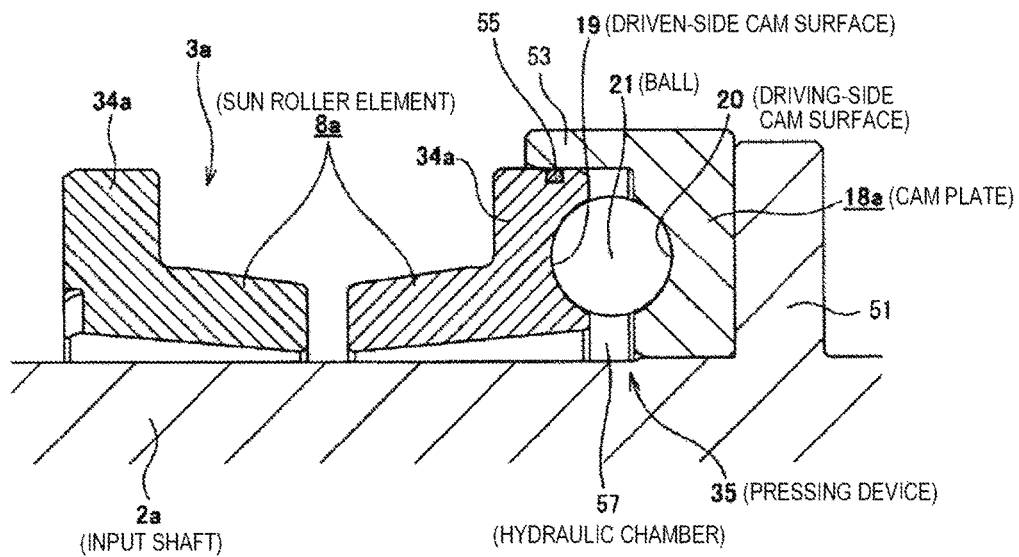
FIG. 8 is an enlarged view of a XIII part of FIG. 7.
Figure 9:
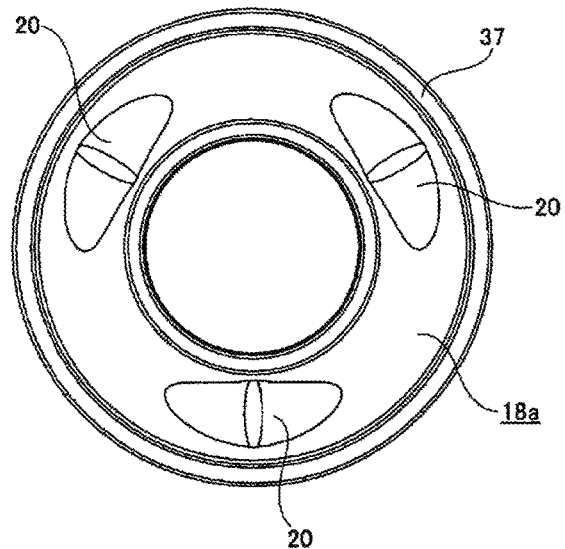
FIG. 9 is an end view of a cam plate.
Figure 10:
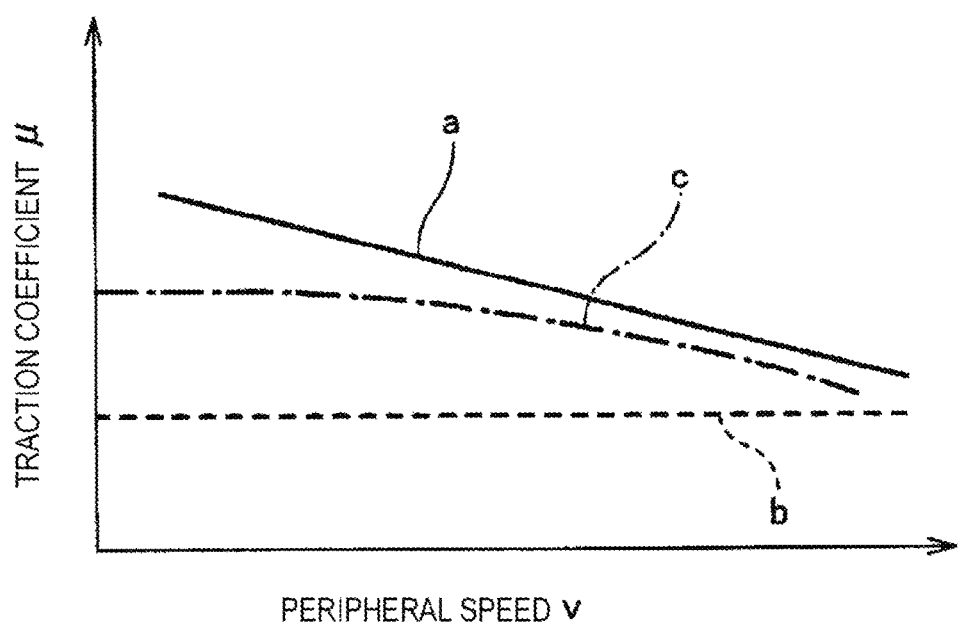
FIG. 10 is a line diagram for explaining an effect of the loading cam device.

FIG. 5 shows a loading cam device in a friction roller-type speed reducer according to a second aspect. In the second aspect, projections 40a, 40a are provided at radially inner side portions of the portions, at which phases in the circumferential direction are offset from the pockets 39, 39, of both axial side surfaces of a retainer 36a. Also, concave portions 41a, 41a of which an axial depth is deepest at the center portion in the circumferential direction and becomes shallower towards both end portions are provided at radially inner side portions, which face the respective projections 40a, 40a, of a base end surface of a disc 38a and one surface of a cam plate 37a. By this configuration, the centrifugal force, which is to be generated at the portions at which the respective projections 40a, 40a are provided as the retainer 36a rotates, is suppressed. Since the structures and operations of the other parts are similar to the first aspect of the friction roller-type speed reducer, the overlapping descriptions are omitted.

<Friction Roller-Type Speed Reducer of Third Aspect>

FIGS. 6 to 12 show a friction roller-type speed reducer according to a third aspect. A feature of the friction roller-type speed reducer is a structure intended to secure the durability and to improve the transmission efficiency while suppressing gross slip by adjusting a traction coefficient μ of each traction part in accordance with a peripheral speed v of each traction part (by increasing a normal force as the peripheral speed v becomes higher). The structures and operations of the other parts are similar to the conventional structure shown in FIGS. 13 to 18. Therefore, the illustration and description of the equivalent parts will be omitted or simplified, and the feature of the third aspect will be mainly described in the below.

In the friction roller-type speed reducer of the third aspect, a pair of loading cam devices 35 are provided at positions of sandwiching a pair of sun roller elements 8a, 8a configuring a sun roller 3a from both axial sides. Since structures of the loading cam devices 35 are similar to each other (except for parts irrelevant to gist of the present invention, for example, the structures configured to apply the preload to the sun roller elements 8a, 8a are symmetric), only one (the right loading cam device 35 in FIGS. 6 to 8) of the loading cam devices 35 will be described in the below.

In the third aspect, the loading cam device 35 includes the sun roller element 8a, a cam plate 18a, and a plurality of balls 21, 21. The sun roller element 8a is supported to an intermediate part of an input shaft 2a concentrically with the input shaft 2a so as to be rotatable relative to the input shaft 2a and to be axially displaceable. An outer peripheral surface of a base end portion of the sun roller element 8a is provided with a collar part 34a having an outward flange shape, and driven-side cam surfaces 19, 19 are provided at a plurality of positions in the circumferential direction of a base end surface of the sun roller element 8a including the collar part 34a. An outer peripheral surface of a tip portion, which is to rolling-contact the outer peripheral surface of each of the intermediate rollers 4, 4 (refer to FIGS. 13 to 18), of the sun roller element 8a is configured as an inclined surface having a partially conical convex surface shape and inclined in a direction along which an outer diameter gradually decreases towards a tip surface. An inner peripheral surface of the sun roller element 8a is configured as an inclined surface having a partially conical concave surface shape and inclined in a direction along which an inner diameter gradually decreases towards the tip surface. For this reason, during the operation of the friction roller-type speed reducer, the lubricant (traction oil) supplied (introduced) from a tip portion opening of the sun roller element 8a is sent towards the base end surface of the sun roller element 8a along the inner peripheral surface of the sun roller element 8a.

The cam plate 18a is supported to a base end side portion of the input shaft 2a concentrically with the input shaft 2a such that the cam plate 18a is rotatable synchronously with the input shaft 2a and axial displacement thereof relative to the input shaft 2a is to be prohibited. To this end, the base end portion of the input shaft 2a is provided with an outward flange portion 51, and the other surface of the cam plate 18a is abutted to one surface (a left surface in FIGS. 6 to 8) of the outward flange portion 51. A plurality of positions in the circumferential direction of one surface of the cam plate 18a is provided with driving-side cam surfaces 20, 20. An outer peripheral edge portion of one surface of the cam plate 18a is provided with a cylindrical part 53 protruding towards a side (a left side in FIGS. 6 to 8) at which the sun roller element 8a is provided, and an inner peripheral surface of the cylindrical part 53 and an outer peripheral surface of the collar part 34a of the sun roller element 8a are made to face closely each other. An O-ring 55, which is an oil seal, is provided between the inner peripheral surface of the cylindrical part 53 and the outer peripheral surface of the collar part 34a, so that an oil-tight state between both the surfaces is kept and the relative rotation between the sun roller element 8a and the cam plate 18a and the axial displacement of the sun roller element 8a relative to the cam plate 18a can be enabled. By this structure, a hydraulic chamber 39 is provided between one surface of the cam plate 18a and the base end surface of the sun roller element 8a.

The respective balls 21, 21 are interposed between the driven-side and driving-side cam surfaces 19, 20.

According to the above-described friction roller-type speed reducer of the third aspect, when the torque is input to the input shaft 2a (when the friction roller-type speed reducer is activated), the axial thickness of the loading cam device 35 increases based on the engagement between each of the balls 21, 21 and each of the cam surfaces 19, 20. The lubricant introduced from the tip portion opening of the sun roller element 8a is sent (introduced) into the hydraulic chamber 39, which is a provision space of the respective balls 21, 21, along the inner peripheral surface of the sun roller element 8a by the centrifugal force generated resulting from the rotation of the sun roller element 8a. Thereby, the rolling-contact parts between each of the balls 21, 21 and each of the cam surfaces 19, 20 are lubricated, so that fretting is prevented at each rolling-contact part. Also, the lubricant is pressed to an outer diameter side portion of the hydraulic chamber 39, so that a hydraulic pressure is increased in the hydraulic chamber 39. Therefore, the axial pressing force which is to be generated by the loading cam device 35 is a summed force of force resulting from the increase in the axial thickness of the loading cam device 35 based on the engagement between each of the balls 21, 21 and each of the cam surfaces 19, 20 and force based on the hydraulic pressure increased in the hydraulic chamber 39. By the summed force, the sun rollers 8a, 8a are pressed in a direction of coming close to each other, so that the surface pressure of each traction part increases.

According to the above-described friction roller-type speed reducer of the third aspect, it is possible to secure the durability and to improve the transmission efficiency. That is, the axial pressing force which is to be generated by the loading cam device 35 is a summed force of the force resulting from the increase in the axial thickness of the loading cam device 35 based on the engagement between each of the balls 21, 21 and each of the cam surfaces 19, 20 and the force which is to be generated as the hydraulic pressure is increased in the hydraulic chamber 39 based on the centrifugal force to be generated as the sun roller element 8a rotates. The force based on the centrifugal force increases as the rotation speed of the sun roller element 8a increases and the centrifugal force by which the lubricant introduced into the hydraulic chamber 39 is pressed to the outer diameter side portion of the hydraulic chamber 39 increases. Therefore, the larger the peripheral speed v of each traction part, the pressing force which is to be generated by the loading cam device 35 increases, so that it is possible to make the traction coefficient μ smaller at each traction part, as shown with a dashed-dotted line c in FIG. 10. As a result, as compared to the conventional structure shown in FIGS. 13 to 18, a relation between the traction coefficient μ and the peripheral speed v comes closer to a relation between the limit traction coefficient $\mu_{max}$ and the peripheral speed v shown with a solid line a in FIG. 10. For this reason, when the peripheral speed v is low, it is possible to suppress the pressing force of each traction part from excessively increasing and to secure the pressing force, which is required when the peripheral speed v is high. Therefore, it is possible to secure the durability and to improve the transmission efficiency.

According to the third aspect, the hydraulic pressure is increased in the hydraulic chamber 39, based on the centrifugal force which is to be generated as the sun roller element 8a rotates. That is, it is not necessary to prepare a pump so as to increase the hydraulic pressure in the hydraulic chamber 39, so that the friction roller-type speed reducer is not enlarged and a pump loss is not caused. Also, the hydraulic chamber 39 is provided in the provision space of the respective balls 21, 21, i.e., between the base end surface of the sun roller element 8a and one surface of the cam plate 18a. That is, the entire axial length of the friction roller-type speed reducer is not increased, unlike a configuration where the hydraulic chamber is newly provided in series with a loading cam mechanism having each of the balls 21, 21 and the cam surfaces 19, 20. From this aspect, it is also possible to prevent the friction roller-type speed reducer from being enlarged.

Also, the lubricant introduced from the tip portion opening of the sun roller element 8a is sent into the hydraulic chamber 39 along the inner peripheral surface of the sun roller element 8a by the centrifugal force which is generated as the sun roller element 8a rotates. As the method of sending the lubricant into the hydraulic chamber provided between the sun roller element and the cam plate, it is considered to provide a lubricant flow path in the input shaft and to send the lubricant into the hydraulic chamber through the lubricant flow path. However, an electric motor to be incorporated in a driving device for an electric vehicle is configured to rotate at speed of 30,000 $[\text{min}^{-1}]$ or higher. In order to supply the lubricant into the lubricant flow path provided in the input shaft configured to rotate at high speed from a housing which does not rotate even during the operation of the friction roller-type speed reducer, a structure of a part configured to send the lubricant into the hydraulic chamber may be complicated. However, in the third aspect, the lubricant is introduced from the tip portion opening of the sun roller element 8a and is sent into the hydraulic chamber 39 along the inner peripheral surface of the sun roller element 8a. Therefore, the structure of the corresponding part is not unduly complicated.

In the third aspect, in order to introduce the lubricant into the hydraulic chamber 39 based on the centrifugal force, the inner peripheral surface of the sun roller element 8a is configured as the inclined surface having a partially conical concave surface shape and inclined in the direction along which the inner diameter gradually decreases towards the tip surface. The outer peripheral surface of the tip portion of the sun roller element 8a is configured as the inclined surface having a partially conical convex surface shape and inclined in the direction along which the outer diameter gradually decreases towards the tip surface. For this reason, the inner peripheral surface of the sun roller element 8a is configured as the inclined surface having a partially conical concave surface shape, so that a radial thickness of a part of the sun roller element 8a, at which the outer peripheral surface is to rolling-contact each of the intermediate rollers 4, 4, is not excessively thinned. Thereby, it is possible to secure the strength and stiffness of the sun roller element 8a and to favorably implement the weight saving.

<Friction Roller-Type Speed Reducer of Fourth Aspect>

Figure 11:
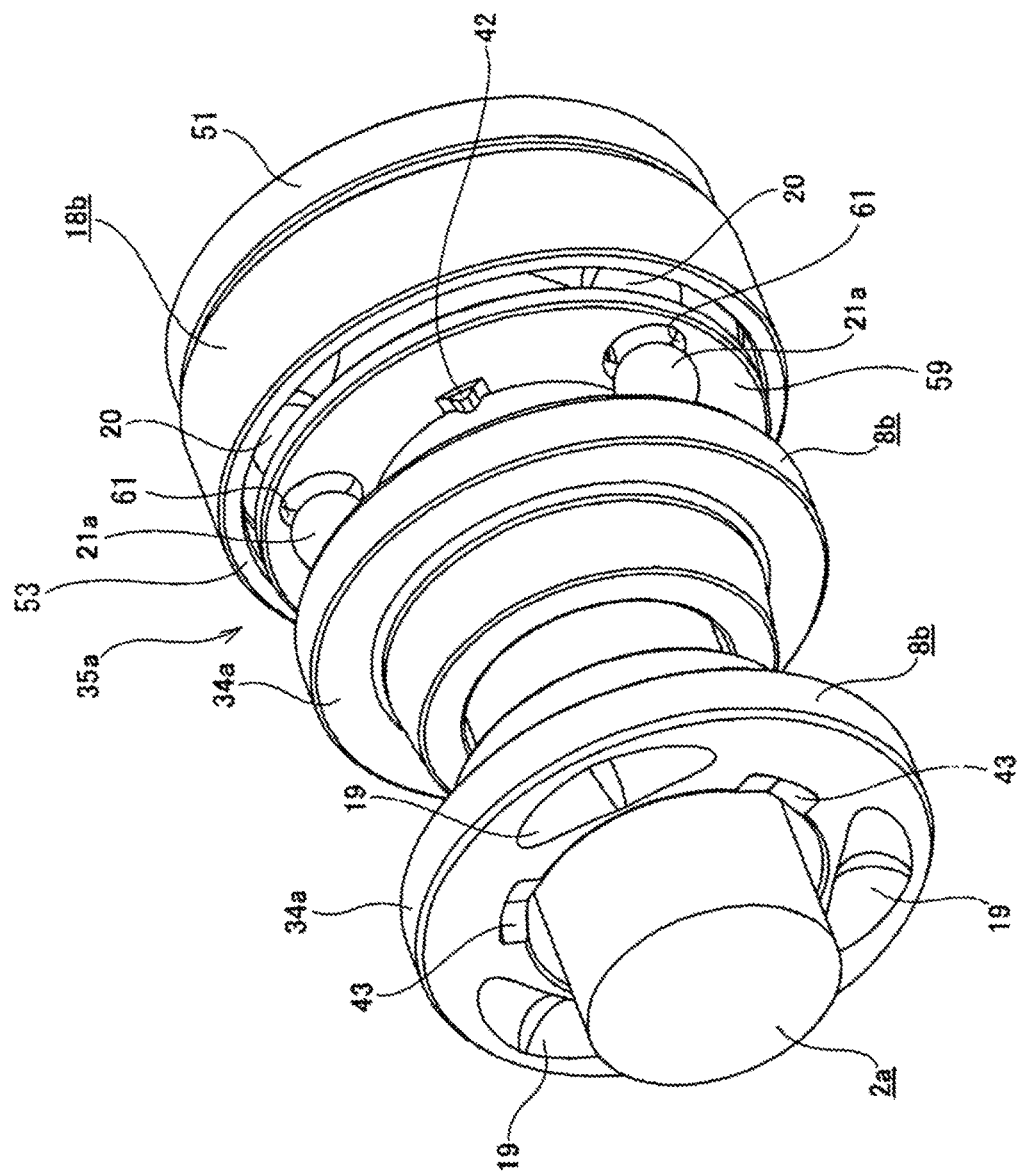
FIG. 11 is an exploded perspective view of the loading cam device in the friction roller-type speed reducer according to the third aspect.
Figure 12:
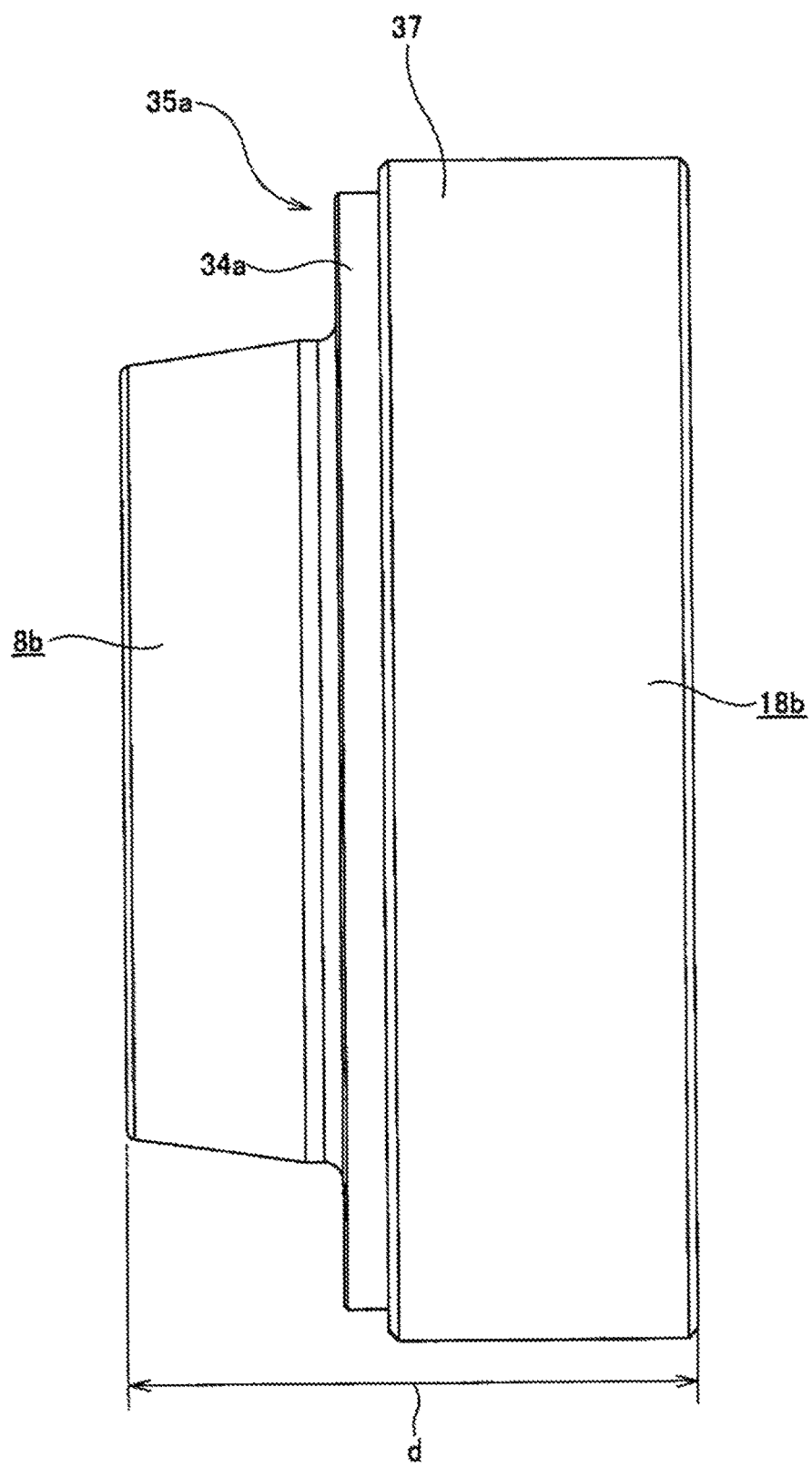
FIG. 12 is a side view showing an assembled state of the loading cam device.
Figure 13:
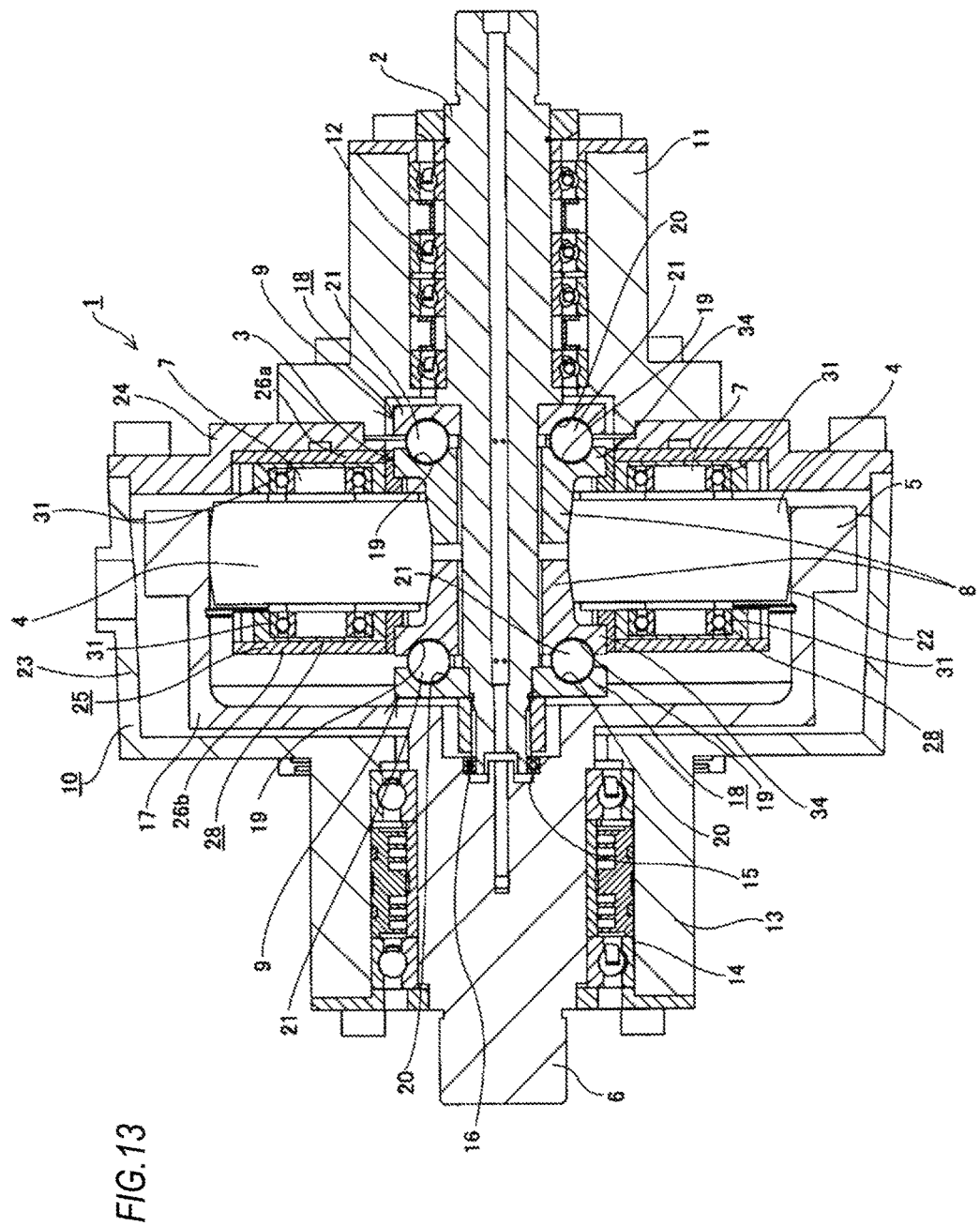
FIG. 13 is a sectional view showing an example of a structure of a conventional loading cam device.
Figure 14A:
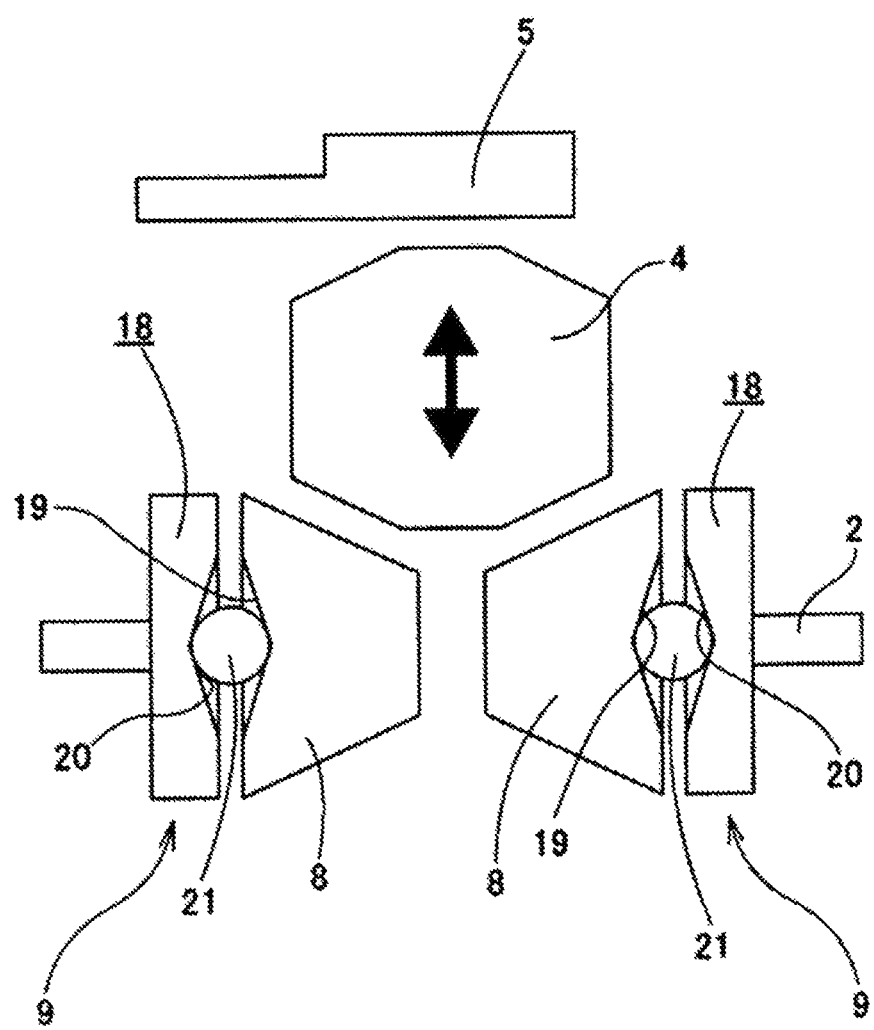
FIG. 14A is a schematic view showing a state where torque is not input to an input shaft, explaining a mechanism for applying a preload.
Figure 14B:
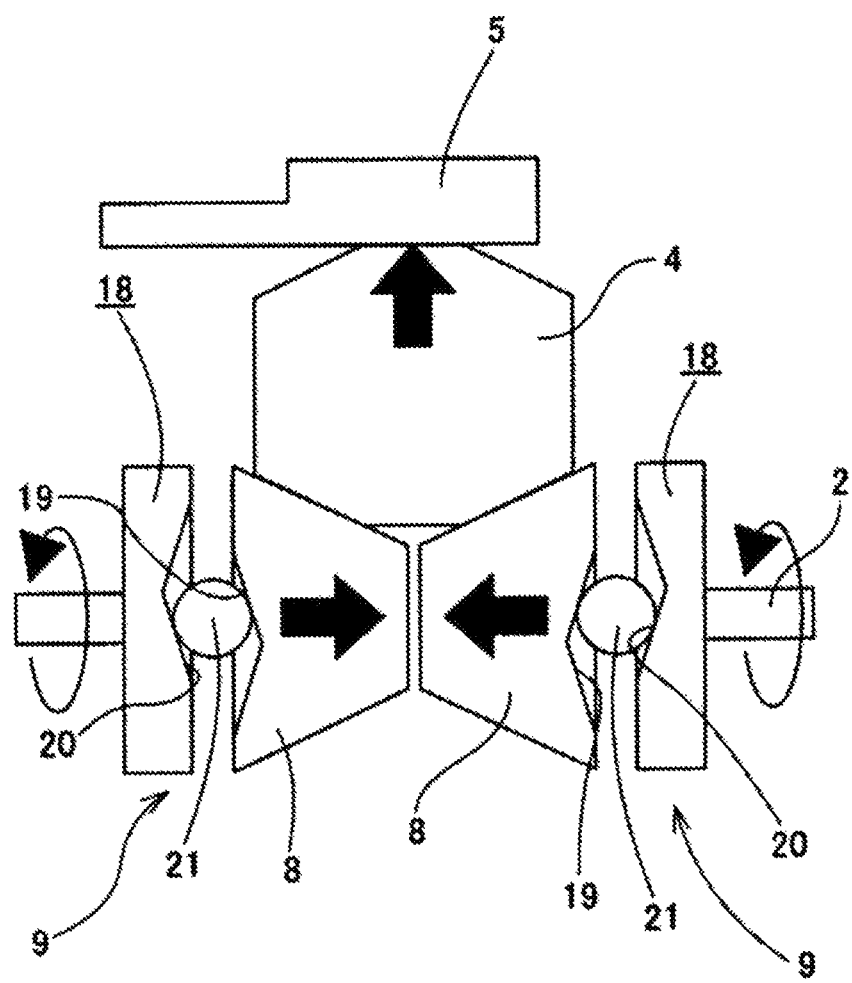
FIG. 14B is a schematic view showing a state where torque is input to the input shaft, explaining the mechanism for applying a preload.
Figure 15:
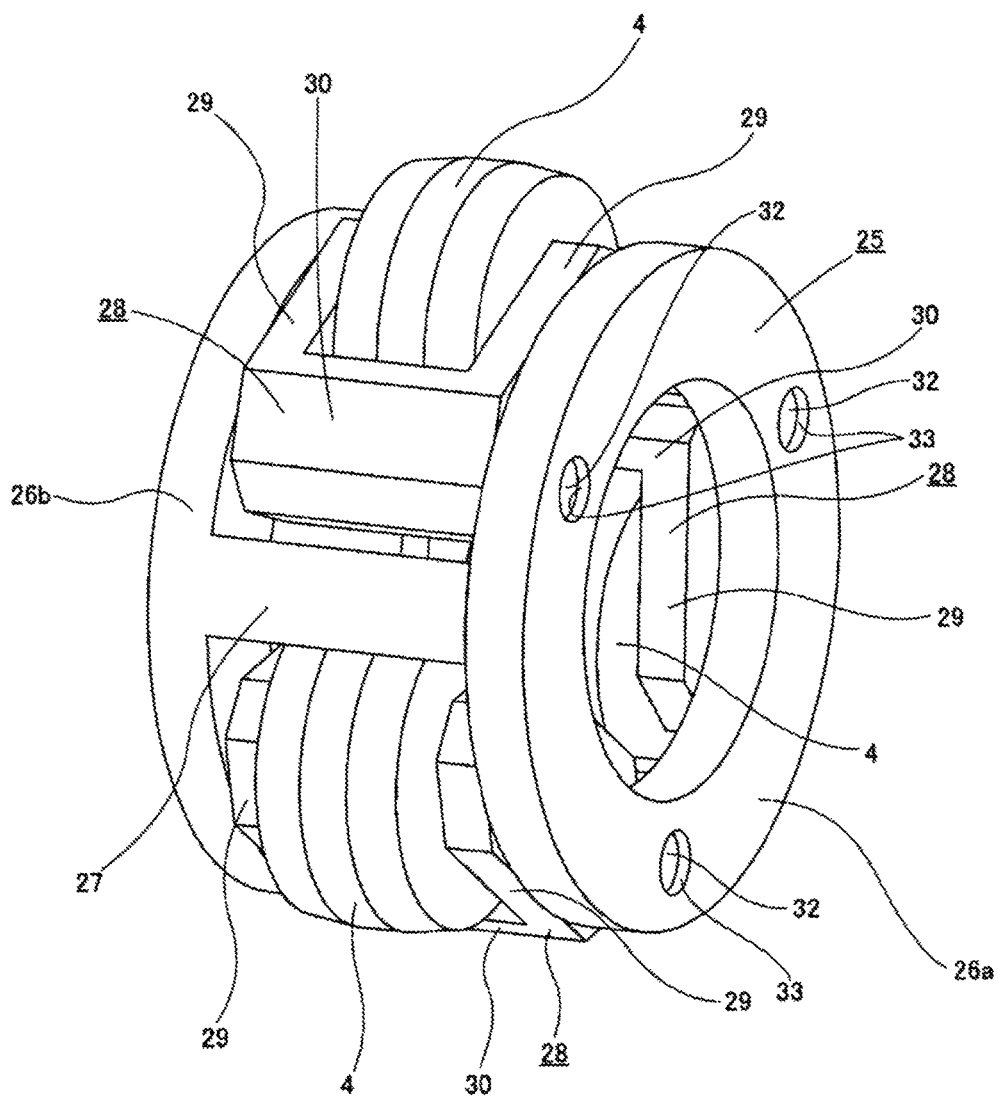
FIG. 15 is a perspective view showing a structure of a part configured to support rotation axes of intermediate rollers to be displaceable in a radial direction of a sun roller and an annular roller.
Figure 16:
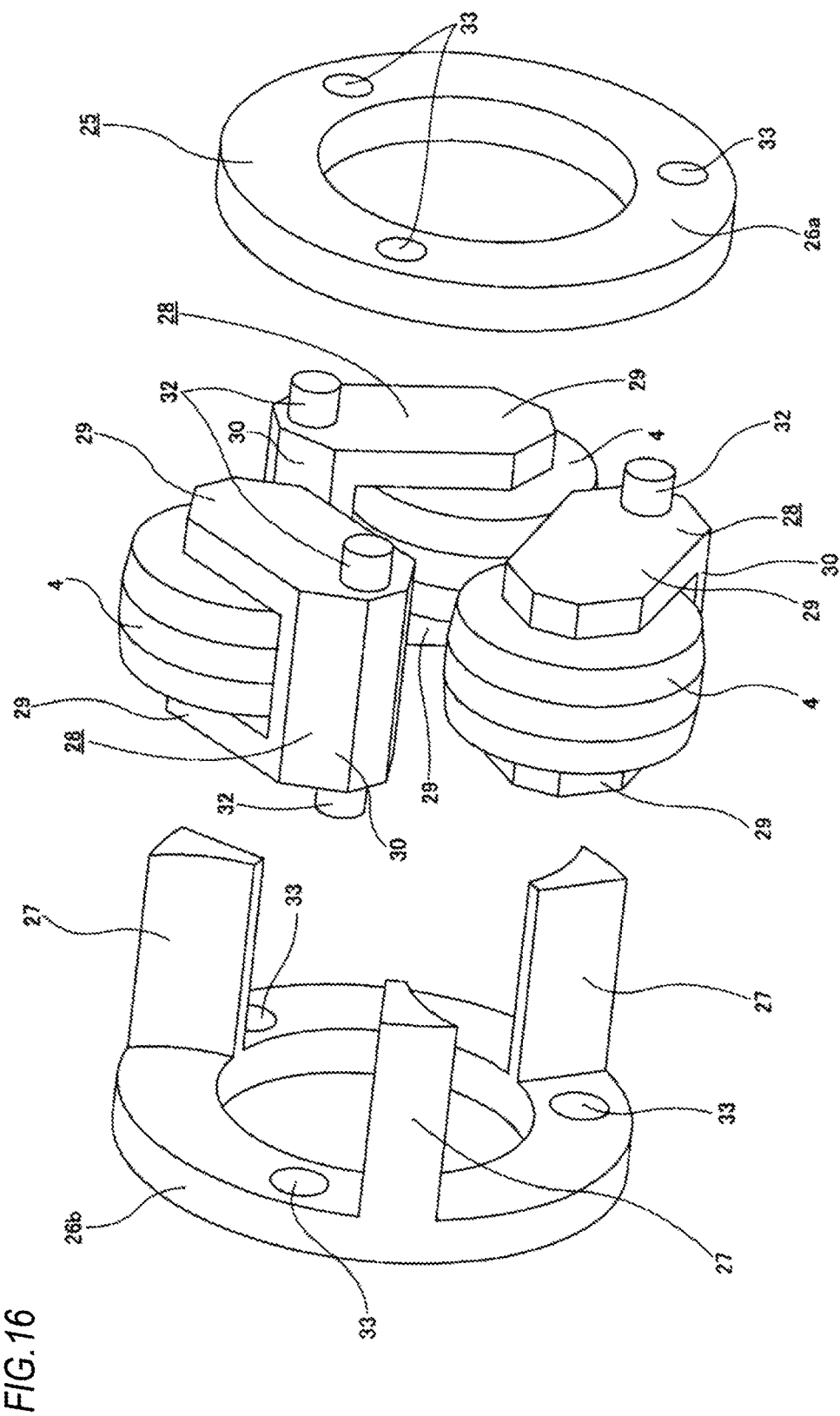
FIG. 16 is an exploded perspective view of a member shown in FIG. 15.
Figure 17:
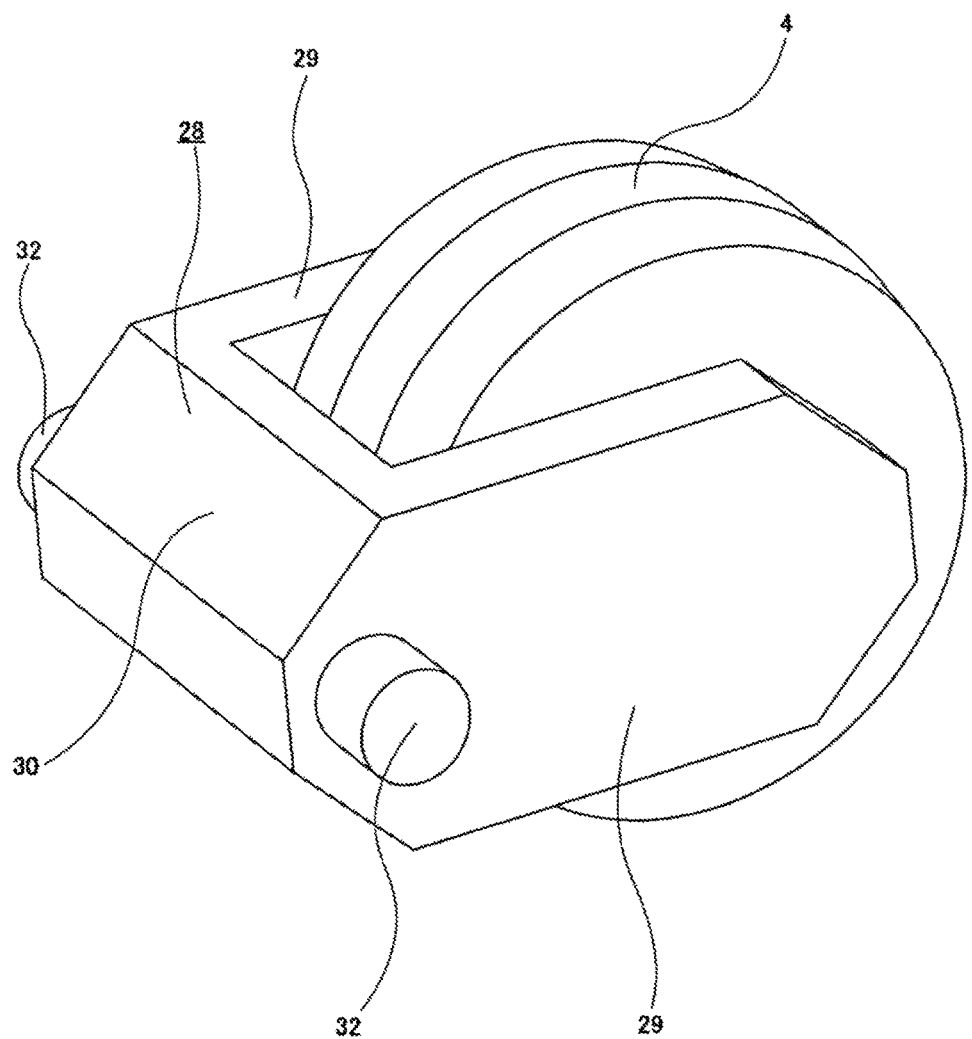
FIG. 17 is a perspective view showing one intermediate roller unit having combined a swing frame and an intermediate roller.
Figure 18:
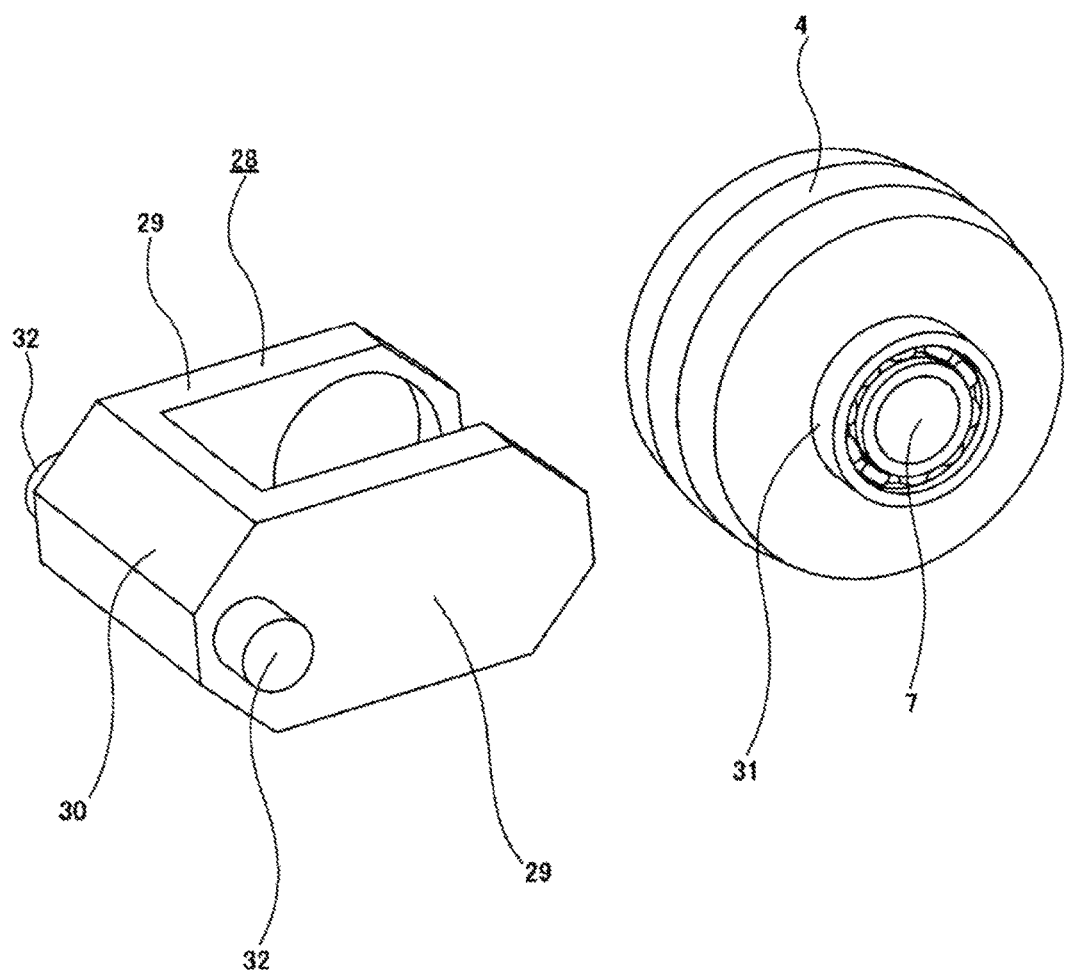
FIG. 18 is an exploded perspective view showing a state where the roller unit is separated into the swing frame and the intermediate roller.
Figure 19:
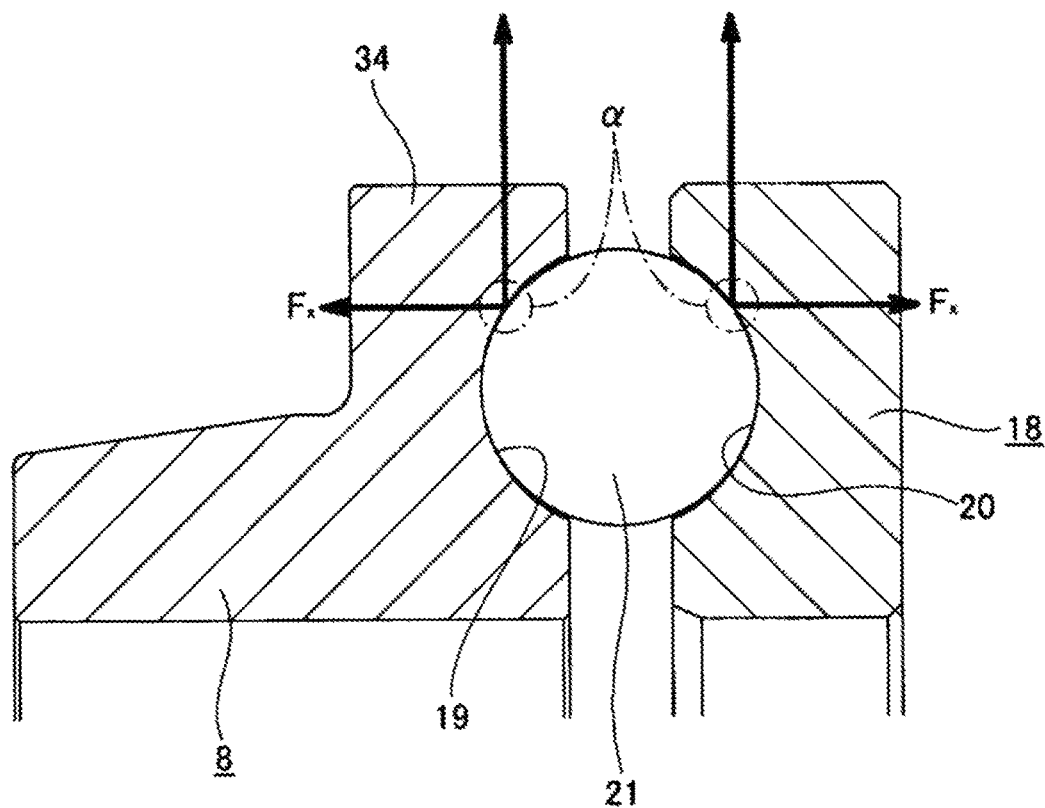
FIG. 19 is a partially enlarged sectional view for explaining an influence of a centrifugal force to be applied to each ball.

FIGS. 11 and 12 show a friction roller-type speed reducer of a fourth aspect. In the fourth aspect, a loading cam device 35a to be mounted to the friction roller-type speed reducer has a retainer 40 configured to bear the centrifugal force, which is to be applied to balls 21a, 21a configuring the loading cam device 35a, and to restrain a radial position of each of the balls 21a, 21a at an appropriate state. The retainer 40 is formed with pockets 61, 61 for rollably holding the respective balls 21a, 21a at a plurality of positions equally spaced in the circumferential direction (three positions, in the shown example). Also, in the fourth aspect, projections 42 protruding towards a base end surface of a sun roller element 8b and one surface of a cam plate 18b are integrally formed with the retainer 40 at positions, at which phases in the circumferential direction are offset from the respective pockets 61, 61, of both axial side surfaces of the retainer 40, i.e., radially inner side portions of middle parts in the circumferential direction between the respective pockets 61, 61 adjacent to each other. An axial height h of each of the projections 42, 42 is made larger than the half of the difference Δd between the maximum value and the minimum value of the axial thickness d of the loading cam device 35a (h>Δd/2).

Concave portions 43, 43 of which an axial depth is deepest at a center portion in the circumferential direction and becomes shallower towards both end portions in the circumferential direction are provided at radially inner side portions of the base end surface of the sun roller element 8b and one surface of the cam plate 18b, which portions face the respective projections 42, 42. An inclination angle θ in the circumferential direction of each of the concave portions 43, 43 is restrained so as to satisfy a relation of R·tan θ=r·tan φ when an inclination angle in the same direction of each of the driven-side and driving-side cam surfaces 19, 20 is denoted as φ, a distance between a center axis of the loading cam device 35a and a radially center portion of each of the concave portions 43, 43 is denoted as R, and a distance between the center axis and a radially center portion of each of the cam surfaces 19, 20 is denoted as r (except for an error not causing a practical problem, such as an inevitable manufacturing error).

Thereby, it is possible to keep a state where a tip portion of each of the projections 42, 42 and a bottom surface of each of the concave portions 43, 43 face closely each other, irrespective of an increase in a gap between the base end surface of the sun roller element 8b and one surface of the cam plate 18b, which is caused as an overriding amount of each of the balls 21a, 21a on each of the cam surfaces 19, 20 increases, similarly to the first aspect described with reference to FIGS. 3A, 3B, 4A and 4B.

In the fourth aspect, the axial height h of each of the projections 42, 42 is made larger than the half of the difference Δd between the maximum value and the minimum value of the axial thickness d of the loading cam device 35a. Therefore, even when the axial thickness of the gap between the base end surface of the sun roller element 8b and one surface of the cam plate 18b becomes largest, the engagement between the respective projections 42, 42 and the respective concave portions 43, 43 is not released.

Also, in the fourth aspect, each of the balls 21a, 21a is made of ceramics (for example, silicon nitride, silicon carbide, alumina or zirconia). For this reason, as compared to a case where each of the balls 21a, 21a is made of iron-based metal (high carbon chromium bearing steel, stainless steel or the like), it is possible to suppress the centrifugal force to be applied to each of the balls 21a, 21a when the rotary shaft rotates.

According to the friction roller-type speed reducer of the fourth aspect having the above-described loading cam device 35a, it is possible to prevent the retainer 40 from coming down or axially ratting, irrespective of the increase in the gap between the base end surface of the sun roller element 8b and one surface of the cam plate 18b, which is associated with the operation of the loading cam device 35a. That is, the tip portion of each of the projections 42, 42 and the bottom surface of each of the concave portions 43, 43 are kept to closely face each other, irrespective of the increase in the gap. For this reason, when the retainer 40 tends to be axially displaced, a situation where the tip portion of each of the projections 42, 42 and the bottom surface of each of the concave portions 43, 43 are contacted each other and the retainer 40 thus comes down or axially rattles is prevented.

In the fourth aspect, the respective projections 42, 42 are formed at the portions of both axial side surfaces of the retainer 40, at which the phases in the circumferential direction are offset from the respective pockets 61, 61. For this reason, an acting position of force to be applied from an inner surface of each of the pockets 61, 61 to the retainer 59 based on the centrifugal force to be applied to each of the balls 21a, 21a and an acting position of force to be applied to the retainer 40 based on the presence of the respective projections 42, 42 are offset in the circumferential direction. As a result, it is possible to prevent the stress from being excessively concentrated on the portions at which the respective pockets 61, 61 are formed, and to secure the durability of the retainer 59.

Since the configurations and operations of the other parts are similar to the third aspect of the friction roller-type speed reducer, the overlapping illustration and description are omitted.

INDUSTRIAL APPLICABILITY

When implementing the loading cam device of the present invention, the radial shape of the projections which are to be formed on both axial side surfaces of the retainer is not limited to the respective aspects of the embodiment. For example, each projection may be formed at a radially middle part of the retainer or may be formed over the radial direction.

The loading cam device of the present invention is used with being incorporated into the friction roller-type speed reducer as shown in FIGS. 13 to 18, for example. In this case, the roller configured to rotate together with the output shaft is not necessarily an annular roller. That is, the present invention can be implemented by using a friction roller-type speed reducer of a planetary roller type. In this case, each of the intermediate rollers is configured as a planetary roller configured to rotate on its own axis while revolving around the sun roller, and the base end portion of the output shaft is coupled to a carrier configured to support each planetary roller such that the torque can be transmitted.

When implementing the loading cam device of the present invention, the roller configured to rotate together with the output shaft is not necessarily an annular roller. That is, the present invention can also be implemented by using a friction roller-type speed reducer of a planetary roller type. In this case, each of the intermediate rollers is configured as a planetary roller configured to rotate on its own axis while revolving around the sun roller, and the base end portion of the output shaft is coupled to a carrier configured to support each planetary roller such that the torque can be transmitted. The annular roller is mounted to an inner surface of the housing with rotation thereof being prohibited.

The present application is based on a Japanese Patent Application No. 2013-69863 filed on Mar. 28, 2013 and a Japanese Patent Application No. 2013-69864 filed on Mar. 28, 2013, which are herein incorporated by reference.

DESCRIPTION OF REFERENCE NUMERALS

1: friction roller-type speed reducer
2, 2a: input shaft
3, 3a: sun roller
4: intermediate roller
5: annular roller
6: output shaft
7: rotation axis
8, 8a, 8b: sun roller element
9: loading cam device
17: coupling part
18, 18a, 18b: cam plate
19: driven-side cam surface
20: driving-side cam surface
21, 21a: ball
22: annular space
31: ball bearing
34, 34a: collar part
35, 35a: loading cam device
36, 36a: retainer
37, 37a: cam plate
38, 38a: disc
39: pocket
40, 40a: projection
41, 41a: concave portion
42: projection
43: concave portion
51: outward flange portion
53: cylindrical part
55: O-ring (oil seal)
57: hydraulic chamber
59: retainer
61: pocket

The invention claimed is:

1. A loading cam device comprising:
a circular plate-shaped cam plate including one axial side surface which is a first cam surface having concaves and convexes in a circumferential direction;
a disc including one axial side surface which faces the first cam surface and is a second cam surface having concaves and convexes in a circumferential direction;
a circular ring-shaped retainer provided between the first cam surface and the second cam surface; and
a plurality of balls provided to contact the first and second cam surfaces at each rolling surface thereof while being rollably held in the retainer,
wherein projections protruding towards the cam plate and the disc are provided on both axial side surfaces of the retainer at a plurality of positions at which phases of the projections in the circumferential direction are offset from pockets for holding the respective balls, and one axial surfaces of the cam plate and the disc are formed with concave portions at portions facing the respective projections, the concave portions having an axial depth deepest at a center portion thereof in the circumferential direction and becoming shallower towards both end portions thereof in the circumferential direction.

2. The loading cam device according to claim 1, wherein the projections are formed at portions at which the phases in the circumferential direction are middle portions between the pockets adjacent to each other.

3. The loading cam device according to claim 1,
wherein when an inclination angle of the both end portions of each concave portion in the circumferential direction is denoted as θ, a distance between a center axis of the retainer and a radially center portion of each concave portion is denoted as R, an inclination angle of each of the first and second cam surfaces is denoted as φ, and a distance between a center axis of each of the disc and the cam plate and a radially center portion of each of the first and second cam surfaces is denoted as r, a relation of R·tan θ=r·tan φ is satisfied.

4. The loading cam device according to claim 1,
wherein an axial height of the projections is larger than a half of a difference between a maximum value and a minimum value of an axial thickness of a gap between the cam plate and the disc.

5. A friction roller-type speed reducer comprising:
an input shaft; an output shaft; a sun roller; an annular roller; a plurality of intermediate rollers; and a loading cam device,
wherein the sun roller includes a pair of sun roller elements axially spaced and arranged concentrically with each other around the input shaft with a gap being interposed between tip surfaces thereof, outer peripheral surfaces of the sun roller elements are configured as inclined surfaces inclined in a direction along which outer diameters gradually decrease towards the tip surfaces thereof, and the inclined surfaces are configured as rolling contact surfaces,
wherein the annular roller is arranged concentrically with the sun roller around the sun roller, and an inner peripheral surface thereof is configured as a rolling contact surface,
wherein outer peripheral surfaces of the intermediate rollers are configured to contact outer peripheral surface of the sun roller and the inner peripheral surface of the annular roller at a state where the intermediate rollers are supported at a plurality of positions in a circumferential direction in an annular space between the outer peripheral surface of the sun roller and the inner peripheral surface of the annular roller so as to be freely rotatable about rotation axes arranged in parallel with the input shaft,
wherein the loading cam device is provided between a disc which is at least one of the sun roller elements and is configured to be rotatable relative to the input shaft, and a cam plate supported to the input shaft so as to be rotatable synchronously with the input shaft, and is configured to rotate the disc while axially pressing the disc towards the other of the sun roller elements as the input shaft rotates,
wherein one member of the annular roller and a member configured to support each of the rotation axes is prohibited from rotating about the sun roller and the other member is coupled to the output shaft such that the output shaft is configured to be rotated by the other member, and wherein the loading cam device is the loading cam device according to claim 1.

6. A friction roller-type speed reducer comprising:
an input shaft; an output shaft; a sun roller; an annular roller; a plurality of intermediate rollers; and a loading cam device,
wherein the sun roller includes a pair of sun roller elements axially spaced and arranged concentrically with each other around the input shaft with a gap being interposed between tip surfaces thereof, outer peripheral surfaces of the sun roller elements are configured as inclined surfaces inclined in a direction along which outer diameters gradually decrease towards the tip surfaces thereof, and the inclined surfaces are configured as rolling contact surfaces,
wherein the annular roller is arranged concentrically with the sun roller around the sun roller, and an inner peripheral surface thereof is configured as a rolling contact surface,
wherein outer peripheral surfaces of the intermediate rollers are configured to contact outer peripheral surfaces of the sun roller and the inner peripheral surface of the annular roller at a state where the intermediate rollers are supported at a plurality of positions in a circumferential direction in an annular space between the outer peripheral surface of the sun roller and the inner peripheral surface of the annular roller so as to be freely rotatable about rotation axes arranged in parallel with the input shaft,
wherein the loading cam device is provided between a moveable sun roller element which is at least one of the sun roller elements and is configured to be rotatable relative to the input shaft, and a cam plate supported to the input shaft so as to be rotatable synchronously with the input shaft, is configured to rotate the moveable sun roller element while axially pressing the movable sun roller element towards the other of the sun roller element as the input shaft rotates, and is configured by interposing rolling elements between a driven-side cam surface provided at a plurality of positions in a circumferential direction of a base end surface of the moveable sun roller element and a driving-side cam surface provided at a plurality of positions in the circumferential direction of one side surface, which faces the base end surface of the moveable sun roller element, of the cam plate fixed to a part of the input shaft and configured to rotate together with the input shaft, and the driving-side cam surface and the driven-side cam surface having a shape where an axial depth gradually changes in the circumferential direction and becomes shallower towards an end portion, respectively,
wherein one member of the annular roller and a member configured to support each of the rotation axes is prohibited from rotating about the sun roller and the other member is coupled to the output shaft such that the output shaft is configured to be rotated by the other member, and
wherein a hydraulic chamber is provided between the moveable sun roller element and the cam plate, the hydraulic chamber is configured to increase a hydraulic pressure therein based on a centrifugal force which is to be generated as the input shaft rotates, and an axial pressing force which is to be generated by the loading cam device is a summed force of a force which is to be generated as each rolling element overrides the driving-side cam surface and the driven-side cam surface and a force which is to be generated as the hydraulic pressure increases.

7. The friction roller-type speed reducer according to claim 6,
wherein an inner peripheral surface of the moveable sun roller element is an inclined surface having a partially conical concave surface shape inclined in a direction along which an inner diameter gradually decreases towards a tip surface, lubricant is supplied from a tip portion opening of the moveable sun roller element, and the lubricant is sent to the hydraulic chamber along the inner peripheral surface of the moveable sun roller element.

8. The friction roller-type speed reducer according to claim 7,
   wherein an outer peripheral surface of a base end portion of the moveable sun roller element is provided with a collar part having an outward flange shape, an outer peripheral surface of the cam plate is provided with a cylindrical part protruding towards a side at which the moveable sun roller element is provided, and an outer peripheral surface of the collar part and an inner peripheral surface of the cylindrical part closely face each other.

9. The friction roller-type speed reducer according to claim 8,
   wherein an oil seal is provided between the outer peripheral surface of the collar part and the inner peripheral surface of the cylindrical part.

10. The friction roller-type speed reducer according to claim 6,
    wherein each rolling element is a ball, a circular ring-shaped retainer configured to hold the balls is provided between the driving-side cam surface and the driven-side cam surface, projections protruding towards the cam plate and the moveable sun roller element are provided on both axial side surfaces of the retainer at a plurality of positions at which phases in the circumferential direction of the projections are offset from pockets for holding the respective balls, and one surface of the cam plate and the base end surface of the moveable sun roller element are formed with concave portions at portions facing the projections, the concave portion having an axial depth deepest at a center portion thereof in the circumferential direction and becoming shallower towards both end portions thereof in the circumferential direction.

11. The friction roller-type speed reducer according to claim 10,
    wherein the projections are formed at portions at which the phases in the circumferential direction are middle portions between the pockets adjacent to each other.

12. The friction roller-type speed reducer according to claim 10,
    wherein when an inclination angle of both end portions of each concave portion in the circumferential direction is denoted as $\theta$, a distance between a rotation center of the input shaft and a radially center portion of each concave portion is denoted as $R$, an inclination angle of each of the first and second cam surfaces is denoted as $\phi$, and a distance between the rotation center of the input shaft and a radially center portion of each of the first and second cam surfaces is denoted as $r$, a relation of $R \cdot \tan \theta = r \cdot \tan \phi$ is satisfied.

13. The friction roller-type speed reducer according to claim 10,
    wherein an axial height of the projection is larger than a half of a difference between a maximum value and a minimum value of an axial thickness of a gap between the cam plate and the moveable sun roller element.

* * * * *